(12) United States Patent
Atarius et al.

(10) Patent No.: US 8,995,318 B2
(45) Date of Patent: Mar. 31, 2015

(54) NETWORK REGISTRATION PROCEDURES

(75) Inventors: Roozbeh Atarius, San Diego, CA (US);
Peerapol Tinnakornsrisuphap, San Diego, CA (US); David A. Ott, San Diego, CA (US); Ramachandran Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 13/076,212

(22) Filed: Mar. 30, 2011

(65) Prior Publication Data

US 2011/0286389 A1 Nov. 24, 2011

Related U.S. Application Data

(60) Provisional application No. 61/320,598, filed on Apr. 2, 2010, provisional application No. 61/349,302, filed on May 28, 2010, provisional application No. 61/355,484, filed on Jun. 16, 2010.

(51) Int. Cl.
| | |
|---|---|
| *H04B 7/00* | (2006.01) |
| *H04W 60/00* | (2009.01) |
| *H04W 8/18* | (2009.01) |
| *H04W 84/04* | (2009.01) |

(52) U.S. Cl.
CPC .............. *H04W 60/00* (2013.01); *H04W 8/183* (2013.01); *H04W 84/045* (2013.01)
USPC .......................................................... 370/310

(58) Field of Classification Search
CPC .. H04L 67/303; H04L 67/327; H04W 76/025

USPC ......... 370/310, 328, 329, 338, 401, 464, 465; 455/403, 414, 422, 435, 446, 450
See application file for complete search history.

(56) References Cited

U.S. PATENT DOCUMENTS

| | | | | |
|---|---|---|---|---|
| 6,668,166 | B1 * | 12/2003 | Kanabar ......................... 455/411 |
| 6,957,067 | B1 * | 10/2005 | Iyer et al. .................... 455/435.1 |
| 7,263,076 | B1 * | 8/2007 | Leibovitz et al. .............. 370/310 |
| 7,613,155 | B2 * | 11/2009 | Shim .............................. 370/338 |
| 7,725,117 | B2 * | 5/2010 | Yamauchi et al. ............. 455/466 |
| 7,916,685 | B2 * | 3/2011 | Schaedler et al. ............. 370/328 |
| 8,077,681 | B2 * | 12/2011 | Ahmavaara et al. .......... 370/338 |
| 8,150,969 | B2 * | 4/2012 | Van Elburg et al. .......... 709/225 |

(Continued)

FOREIGN PATENT DOCUMENTS

| | | |
|---|---|---|
| CN | 101247318 A | 8/2008 |
| CN | 101345748 A | 1/2009 |

(Continued)

OTHER PUBLICATIONS

3GPP TS 29.329 standard, Sh Interface based on the Diameter protocol, 3GPP, Dec. 2008, pp. 1-19.*

(Continued)

*Primary Examiner* — Dmitry H Levitan

(57) ABSTRACT

A method of communication involves sending a request from a first network entity (e.g., a femto convergence server) to a second network entity (e.g., a home subscriber server) for user data relating to an access point, receiving a response to the request, wherein the response identifies at least one application server, and sending registration status information to the identified at least one application server.

56 Claims, 19 Drawing Sheets

(56) References Cited

U.S. PATENT DOCUMENTS

| | | | |
|---|---|---|---|
| 8,165,063 B2* | 4/2012 | Kim et al. | 370/328 |
| 8,170,005 B2* | 5/2012 | Mukaiyama et al. | 370/352 |
| 8,213,913 B2* | 7/2012 | Ghai et al. | 455/414.2 |
| 8,265,090 B2* | 9/2012 | Cai et al. | 370/410 |
| 8,271,667 B2* | 9/2012 | Hoshino et al. | 709/229 |
| 8,320,344 B2* | 11/2012 | Hodroj et al. | 370/338 |
| 8,447,277 B2* | 5/2013 | Sweeney et al. | 455/414.1 |
| 8,477,688 B2* | 7/2013 | Shi | 370/328 |
| 8,493,944 B2* | 7/2013 | Suzuki et al. | 370/338 |
| 8,515,421 B2* | 8/2013 | Shaheen et al. | 455/435.1 |
| 8,559,392 B2* | 10/2013 | Ramankutty et al. | 370/331 |
| 2006/0035636 A1* | 2/2006 | Pirila | 455/435.2 |
| 2008/0248799 A1* | 10/2008 | Choi | 455/426.1 |
| 2009/0028120 A1* | 1/2009 | Lee | 370/338 |
| 2009/0067417 A1* | 3/2009 | Kalavade et al. | 370/356 |
| 2009/0129336 A1* | 5/2009 | Osborn | 370/331 |
| 2009/0191844 A1* | 7/2009 | Morgan et al. | 455/411 |
| 2009/0298470 A1* | 12/2009 | Huber et al. | 455/411 |
| 2010/0041375 A1* | 2/2010 | Osborn | 455/411 |
| 2010/0048176 A1* | 2/2010 | Osborn | 455/411 |
| 2010/0113016 A1* | 5/2010 | Gayde et al. | 455/433 |
| 2011/0185061 A1* | 7/2011 | Chen et al. | 709/225 |

FOREIGN PATENT DOCUMENTS

| | | |
|---|---|---|
| WO | WO2009054901 A2 | 4/2009 |
| WO | 2009147923 A1 | 12/2009 |

OTHER PUBLICATIONS

3GPP2: "cdma2000 Femtocell Network: Overview", Internet Citation, Jan. 1, 2010, pp. 1-14, XP002639727, Retrieved from the Internet: URL:http://www.3gpp2.org/publi cjrtml/specs /X.S0059-000-0_v1.0_100216.pdf [retrieved on May 30, 2011] the whole document.

3GPP2: "cdma2000 Femtocell Network:Ix and IMS Network Aspects", Internet Citation, Jan. 1, 2010, pp. 1,7-16, XP002639726, Retrieved from the Internet: URL:http://www.3gpp2.org/public html/specs /X.S0059-200-0_v1.0.100216.pdf [retrieved on May 30, 2011]Y chapter 5.1.1.1 46-51, chapter 5.1.1.2 54-59, p. 5.1.2 62,63, chapter 8.3.

David Ott, Atarius Roozbeh: "3GPP2 Femtocell Zone Enablers", Quaicomm, Jun. 21, 2010, pp. 1-17, XP002653225, Retrieved from the Internet: URL:ftp.3gpp2.org [retrieved on Jul. 26, 2011] the whole document.

Dynamics0ft: "Support of originating , requests from Application Servers", 3GPP Draft; 031R1-23218(2144), 3rd Generation Partnership Project (3GPP), Mobile Competence Centre ; 650, Route Des , Lucioles ; F-06921 Sophia-Antipolis Cedex France, vol. TSG CN, No. Bangkok, Thailand; 20021127, Nov. 27, 2002, XP050054222, [retrieved on Nov. 27, 2002] the whole document.

International Search Report and Written Opinion—PCT/US2011/031016—ISA EPO—Aug. 8, 2011 (092529WO).

Qualcomm Europe: "UE Registration and Access Control for UTRA HNBs", 3GPP Draft; R3-081658, 3rd Generation Partnership Project (3GPP), Mobile Competence Centre ; 650, Route Des Lucioles ; F-06921 Sophia-Antipolis Cedex ; France, vol. RAN WG3, No. Sophia Antipolis, France; Jun. 9, 2008, XP050165896, [retrieved on Jun. 9, 2008] chapter 2.5.2 chapter 2.7.

European Search Report—EP13176090—Search Authority—Munich—Sep. 12, 2013.

Network Architecture Model for cdma2000 Femtocell Enabled Systems,X30-20091207-xxxA_Editor Mot s.p0135-0 v0.4 draft_femto_nam-2,3GPP2,Dec. 7, 2009.

Nortel,Correction to 3rd party registration procedures for Session_Terminated default handling,done-24229_cr1063r2_(rel-6)_c1-051672-2,3GPP2,Nov. 4, 2005.

Palanigounder A, Femto AP IMS Registration Security,S40-20081201-004r1_Femto IMS Reg Sec,3GPP2 ,Dec. 1, 2008.

Palanigounder A, Femtocell Security Framework,s.s0132-0_v1.0_femtocell_security_framework-3, 3GPP2,Jan. 28, 2010.

Sundarraman C, Proposed Modifications to Stage 2 Call Flow_FAP_Registration,X30-20090615-016R1 QC_Proposed modifications to FAP registration stage 2 call flow-1,3GPP2,Jun. 15, 2009.

Sundarraman C, Stage 3 text for MS Registration,X30-20090330-006 QC_Stage3_MS_Registration-1,3GPP2,Mar. 30, 2009.

Towle T, MMD Stage-2: Revisions to service architecture of draft baseline N.P0024.2 based on TS 23.228,05 ims service archtecture changes,3GPP2,Aug. 5, 2002.

Tatara Systems et al: "IMS HNB reference architecture proposal", 3GPP Draft; S2-095793-WAS-095236_S2_75_TSI_IMS HNB_ARC Hitecture, No. Kyoto; Sep. 4, 2009, Aug. 31, 2009, XP050397164, [retrieved on Sep. 6, 2009] A 6.x.2.3 HNB-CAS 45-68 6.x.4.1.1 HNB IMS Registration 6.x.4.1.2 UE Registration and Authentication.

Chen J. et al., "Femtocells—Architecture & Network Aspects", Qualcomm, http://www.qualcomm.com/common/documents/white_papers/Femto_Overview_Rev_C.pdf, Jan. 28, 2010, p. 1-7.

* cited by examiner

NETWORK REGISTRATION PROCEDURES

CLAIM OF PRIORITY

This application claims the benefit of and priority to commonly owned U.S. Provisional Patent Application No. 61/320,598, filed Apr. 2, 2010; U.S. Provisional Patent Application No. 61/349,302 filed May 28, 2010; U.S. Provisional Patent Application No. 61/355,484, filed Jun. 16, 2010, the disclosure of which is hereby incorporated by reference herein.

BACKGROUND

1. Field

This application relates generally to wireless communication and more specifically, but not exclusively, to network registration procedures.

2. Introduction

A wireless communication network may be deployed over a defined geographical area to provide various types of services (e.g., voice, data, multimedia services, etc.) to users within that geographical area. In a typical implementation, access points (e.g., corresponding to different cells) are distributed throughout a network to provide wireless connectivity for access terminals (e.g., cell phones) that are operating within the geographical area served by the network.

As the demand for high-rate and multimedia data services rapidly grows, there lies a challenge to implement efficient and robust communication systems with enhanced performance. To supplement conventional network access points (e.g., macro access points), small-coverage access points may be deployed (e.g., installed in a user's home) to provide more robust indoor wireless coverage or other coverage to access terminals. Such small-coverage access points may be referred to as, for example, femto access points, femto cells, home NodeBs, home eNodeBs, or access point base stations. Typically, such small-coverage access points are connected to the Internet and the mobile operator's network via a DSL router or a cable modem. For convenience, small-coverage access points may be referred to as femto cells or femto access points in the discussion that follows.

As an access terminal roams throughout the geographical area served by the network, the access terminal may enter the coverage areas of different access points (e.g., femto access points) that provide access to different types of services. Accordingly, there is a need for efficient mechanisms that enable the access terminals to gain access to these services.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

The disclosure relates in some aspects to registration procedures that facilitate access to network-based applications. For example, a subscription for an access point (e.g., a femto access point) may enable the access point to provide access to a defined set of applications. These applications are served by one or more application servers, whereby the access point may gain access to the applications when it registers with an associated Internet Protocol (IP) service (e.g., IP Multimedia Subsystem (IMS)). To facilitate access to these applications, the application servers are notified of the registration status of the access point. In this way, when an access terminal is being served by such an access point, the access terminal is allowed access to the specific applications associated with that access point.

The disclosure relates in some aspects to a network entity that identifies an application server that is associated with an access point and informs the application server of the registration status of an access point. For example, a method of communication may comprise: sending a request from a first network entity (e.g., a femto convergence server) to a second network entity (e.g., a home subscriber server) for user data relating to an access point; receiving a response to the request, wherein the response identifies at least one application server; and sending registration status information to the identified at least one application server.

The disclosure relates in some aspects to enabling an access terminal to gain access to certain applications when the access terminal is within the coverage of a specified access point (e.g., a femto access point). For example, an access terminal that is registered with an IP service (e.g., IMS) or a circuit switched-based (CS-based) access terminal may be configured with a list of access points at which the access terminal is to register whenever the access terminal is within the coverage of one of these access points. As a result of this registration, a corresponding application server is notified that the access terminal at a particular access point. In this way, the access terminal may be granted access to the specific applications associated with that access point when the access terminal is within the coverage of the access point.

The disclosure relates in some aspects to an access terminal that registers at certain access points whenever the access terminal is within the coverage of any of those access points. For example, a method of communication may comprise: maintaining a list at an access terminal, wherein the list identifies at least one access point at which the access terminal is to register; receiving a signal from a first access point; determining that the first access point is identified by the list; and registering at the first access point as a result of the determination that the first access point is identified by the list.

BRIEF DESCRIPTION OF THE DRAWINGS

These and other sample aspects of the disclosure will be described in the detailed description and the appended claims that follow, and in the accompanying drawings, wherein:

Figure 1:
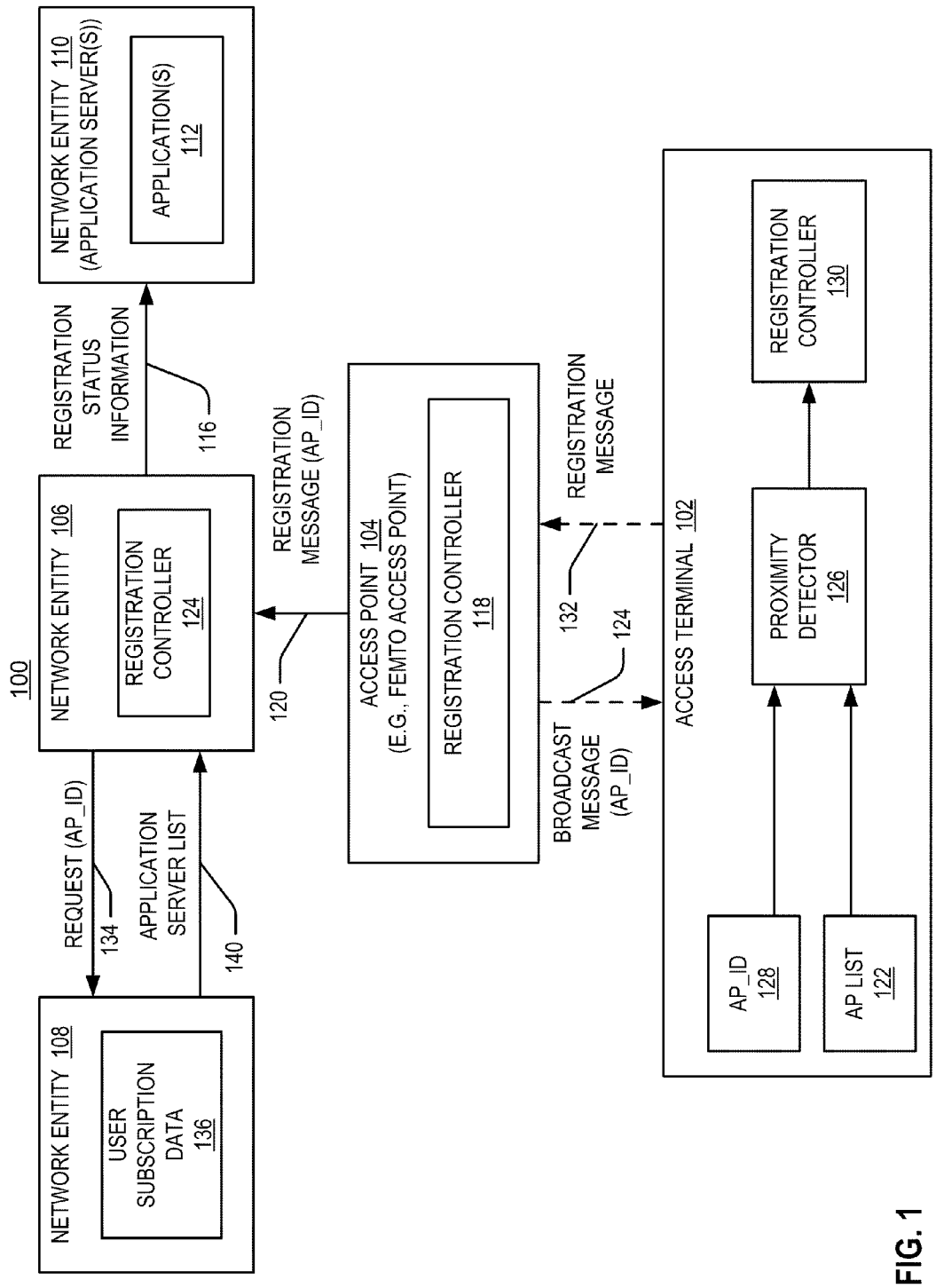
FIG. 1 is a simplified block diagram of several sample aspects of a communication system adapted to provide access to specified applications at specified access points.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, and so on, while access terminals may be referred to or implemented as user equipment (UEs), mobile stations, and so on.

Access points in the system 100 provide access to one or more services (e.g., network connectivity) for one or more wireless terminals (e.g., an access terminal 102) that may be installed within or that may roam throughout a coverage area of the system 100. For example, at various points in time the access terminal 102 may connect to an access point 104 or some access point in the system 100 (not shown). Each of these access points may communicate with one or more network entities (represented, for convenience, by network entities 106, 108, and 110) to facilitate wide area network connectivity.

These network entities may take various forms such as, for example, one or more radio and/or core network entities. Thus, in various implementations a network entity may represent functionality such as one or more of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; performing registration related operations; and providing access control for access terminals. Two of more of these network entities may be co-located and/or two or more of these network entities may be distributed throughout a network.

The disclosure relates in some aspects to techniques that enable the access terminal 102 and other access terminals to gain access to specific applications that are available from the access point 104 (e.g., a femto access point) and other access points. For example, the access point 104 may provide access to one set of applications while another femto access point may provide access to another set of applications. Various techniques are described herein to facilitate this access.

The access point 104 is configurable to provide access to one or more applications 112 that are served by the network entity 110 (comprising one or more application servers). As a simple example, upon registering with an IP service (e.g., IMS), the access point 104 and/or the access terminal 102 may be subscribed to applications A, B, and C. In this way, when the access terminal 102 is served by the access point 104, the access terminal 102 may gain access to any one of applications A, B, and C.

To trigger access to a given one of these applications, the associated application server is informed of the registration status of the access point 104 and/or the access terminal 102.

For example, the network entity 106 (e.g., a registration controller 124) may send registration status information 116 to the network entity 110 to inform the appropriate application server that the access point 104 has registered. Upon receiving this registration information, the application server allows an access terminal being served by the access point 104 to use the subscribed application(s). Here, the access point 104 (e.g., a registration controller 118) commences registration by sending a registration message 120 to the network entity 106. The registration message 120 includes an identifier (AP_ID) of the access point 104 such as, for example, a cell identifier. Upon receiving the registration message 120, the network entity 106 identifies the appropriate application server (discussed below) and sends corresponding registration status information 116 to the application server.

Similarly, the network entity 106 (e.g., the registration controller 124) may send registration status information 116 to the network entity 110 to inform the appropriate application server that the access terminal 102 is at the access point 104 (e.g., the access terminal 102 has registered at the access point 104). Upon receiving this registration information, the application server allows the access terminal 102 to use the subscribed application(s) at the access point 104.

In this case, the access terminal 102 may be configured to register at the access point 104 whenever the access terminal 102 determines that it is near (e.g., within the coverage of) the access point 104. For example, the access terminal 102 may maintain a list of access points (AP list 122) at which the access terminal 102 is to register whenever the access terminal 102 is within the coverage of one of these access points. When the access terminal 102 is in the vicinity of the access point 104, the access terminal 102 receives a broadcast message 124 from the access point 104, where the broadcast message comprises an identifier (AP_ID) of the access point 104. Thus, a proximity detector 126 may determine whether the access terminal 102 is in the vicinity of the access point 104 by determining whether the received AP_ID 128 is in the AP list 122. If so, the access terminal (e.g., a registration controller 130) registers at the access point 104 by sending a registration message 132 to the access point 104. The registration message 132 may include, for example, an identifier of the access terminal 102 as well as an identifier of the access point 104. The access point 104, in turn, forwards the registration message to the network entity 106. Upon receiving this registration message, the network entity 106 identifies the appropriate application server (discussed below) and sends corresponding registration status information 116 to the application server.

In accordance with the teachings herein, the network entity 106 identifies the appropriate application server to which the registration status information 116 is to be sent upon receiving a registration message regarding the registration of the access point 104 or the access terminal 102. For example, the network entity 106 may send a request 134 to the network entity 108 (e.g., that maintains user subscription data 136) for application server information associated with a particular access point. Thus, in this example, the request 134 includes the (AP_ID) of the access point 104 and may include an identifier of the access terminal 102. In response to this request, the network entity 108 sends a list 140 that identifies one or more application servers associated with the access point 104 (e.g., and optionally the access terminal 102). Upon receiving the list 140, the network entity 106 sends the corresponding registration status information 116 to the application server(s) identified by the list 140.

An application server also may be informed of the registrations status of the access point 104 and/or the access terminal 102 in conjunction with terminating access to an application. For example, the network entity 106 may inform the appropriate application server whenever the access point 104 deregisters, the access terminal 102 deregisters, or the access terminal 102 leaves the coverage of the access point 104.

Sample operations that may be performed by network entities such as those described in FIG. 1 will be described in more detail in conjunction with the flowchart of FIG. 2. In particular, this example illustrates how a network entity may inform one or more application servers of the registration status of an access terminal or access point. To further illustrate these concepts, the operations of FIG. 2 also will be described with reference to a sample 3GPP2 scenario where a femto convergence server (FCS) sends a request to a home subscriber server (HSS) to identify the application server(s) associated with a femto access point (FAP). It should be appreciated, however, that the disclosed concepts are not limited to a 3GGP2-based system.

Figure 2:
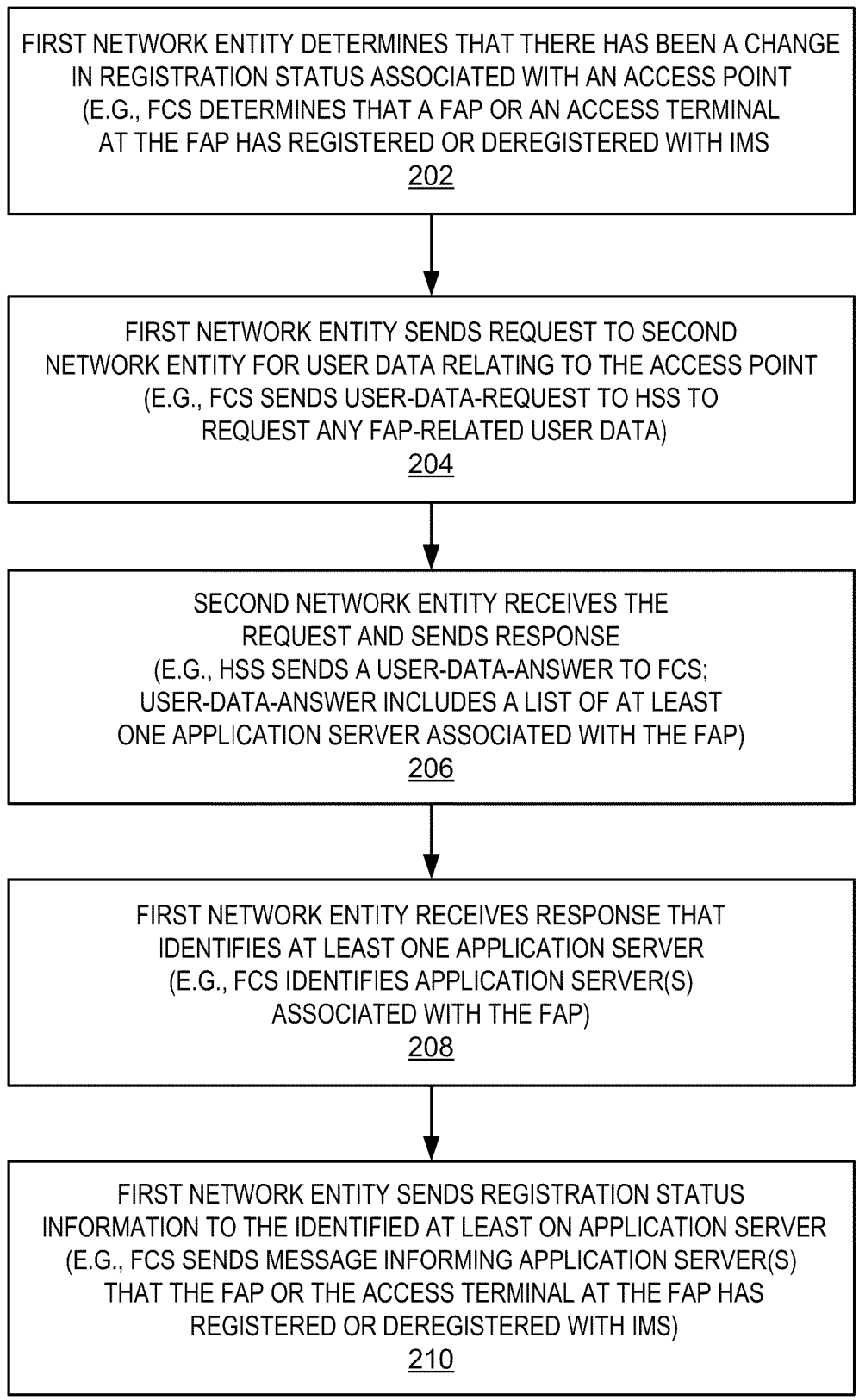
FIG. 2 is a flowchart of several sample aspects of operations that may be performed in conjunction with providing registration status information to an application server.
Figure 7:
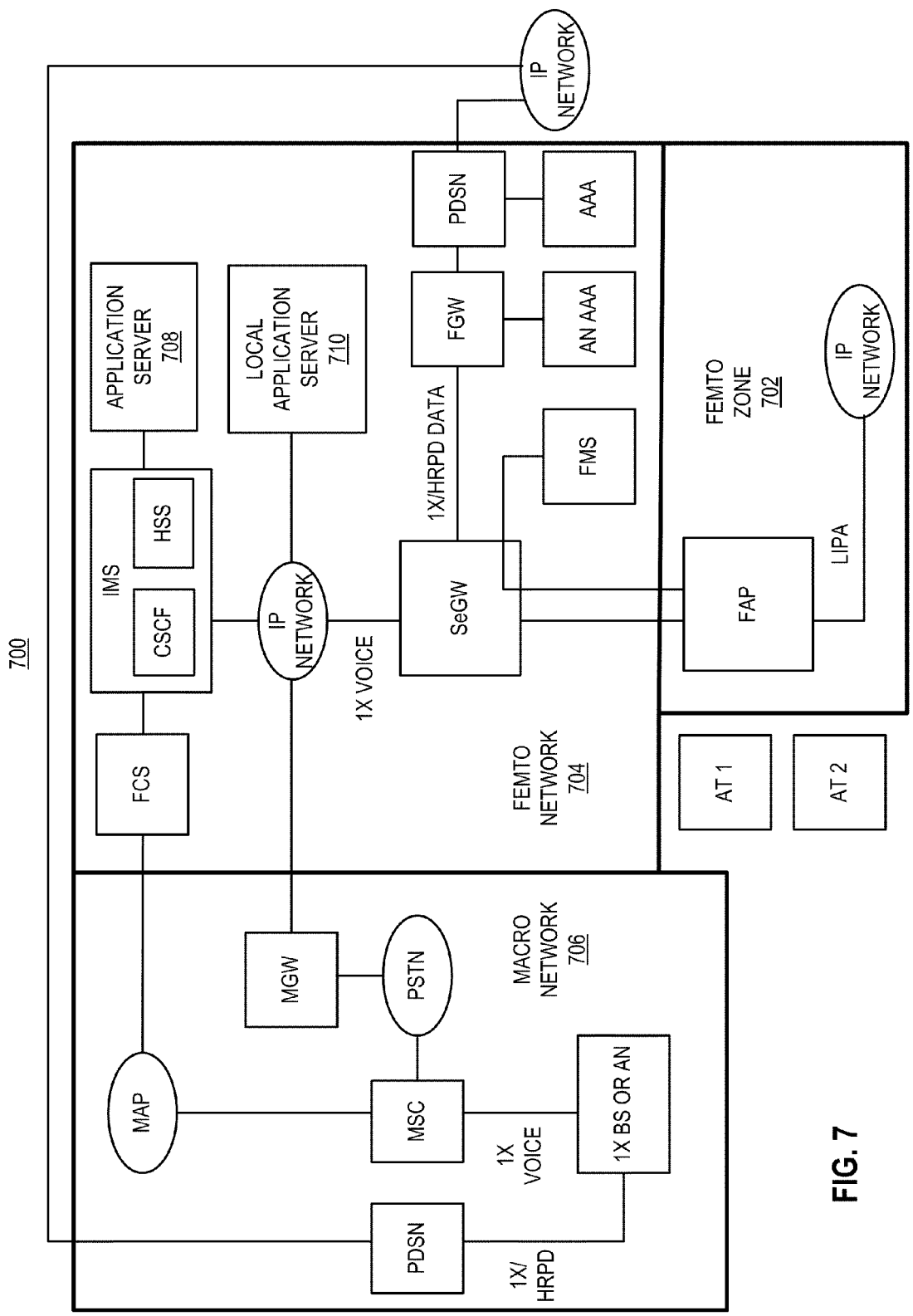
FIG. 7 is a simplified block diagram of several sample aspects of a communication system comprising a femto zone.
Figure 13:
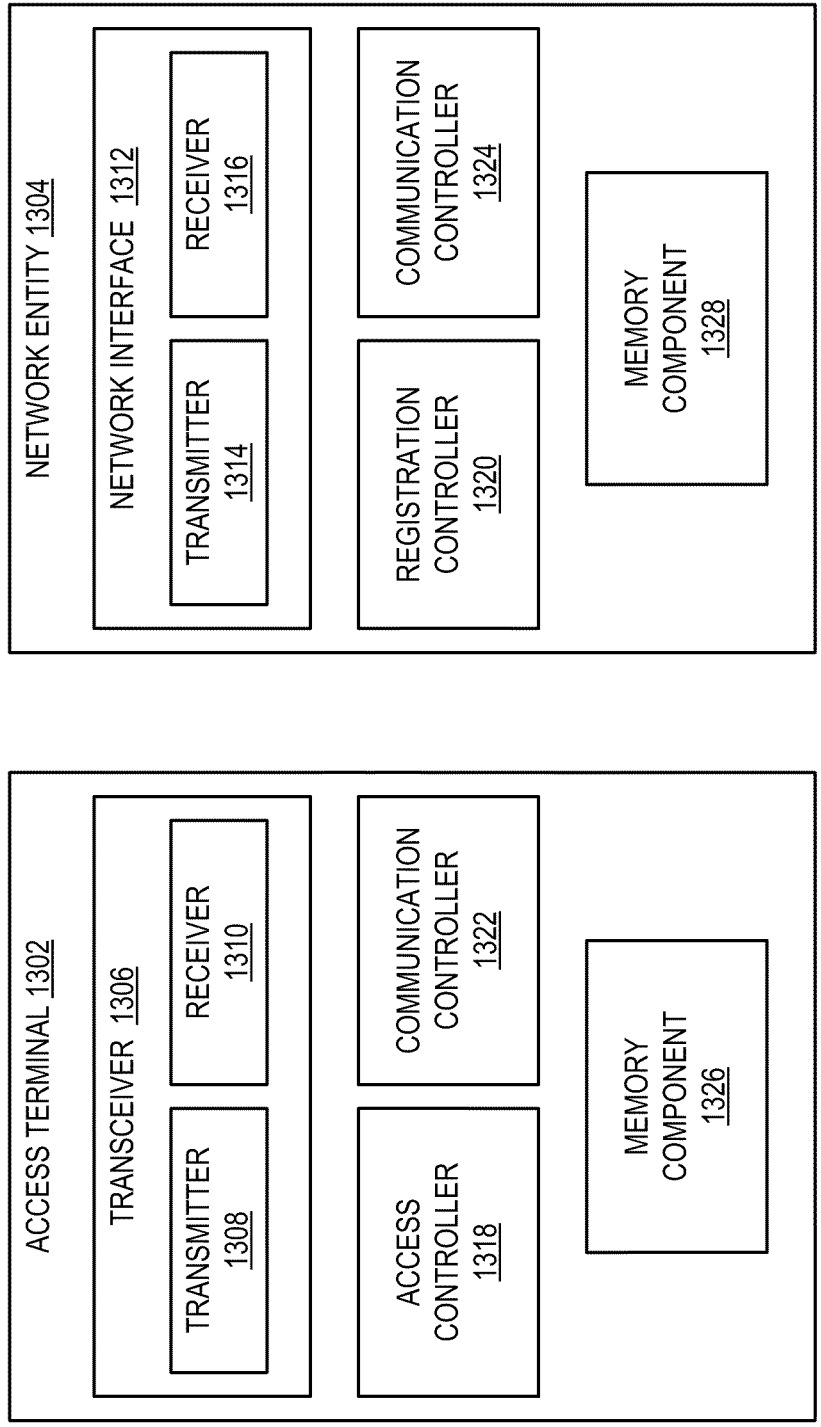
FIG. 13 is a simplified block diagram of several sample aspects of components that may be employed in communication nodes.

For convenience, the operations of FIG. 2 (or any other operations discussed or taught herein) may be described as being performed by specific components (e.g., the components of FIG. 1, FIG. 7, or FIG. 13). It should be appreciated, however, that these operations may be performed by other types of components and may be performed using a different number of components. It also should be appreciated that one or more of the operations described herein may not be employed in a given implementation.

As represented by block 202, a first network entity determines that there has been a change in the registration status associated with an access point. This change in registration status may involve, for example, registration of an access point, registration of an access terminal, deregistration of an access point, deregistration of an access terminal, or some other condition. As discussed above, the first network entity may detect such a change in registration status based on receipt of a registration message from the access point or access terminal.

In the sample 3GPP2 scenario, the operations of block 202 may involve the FCS determining that a FAP or an access terminal at the FAP has registered or deregistered with IMS. As discussed in more detail below, registration of the FAP or the access terminal causes a message to be sent to the FCS associated with that FAP. Thus, upon receipt of this message, the FCS may detect the change in registration status.

As represented by block 204, the first network entity sends a request to a second network entity for user data relating to the access point. Here, the nature of the request (e.g., a specific command associated with the request) or information included in the request (e.g., a command parameter) indicates that information about any application servers associated with the access point is being requested. For example, a command may request that all information associated with an access point be provided (thereby inherently requesting application server information), or a command may explicitly request that application server information be provided. In addition, the request is sent in a manner that enables the second network entity to determine the identity of the access point (e.g., the request includes an access point identifier).

In the sample 3GPP2 scenario, the operations of block 204 may involve the FCS sending a Diameter protocol User-Data-Request (UDR) to an HSS to request any FAP-related user data. This UDR may include, for example, the FAP identity and subscription data relating to the FAP.

As represented by block 206, the second network entity receives the request and sends a corresponding response to the first network entity. This response may identify at least one application server. For example, the response may include a list of one or more application servers associated with the access point.

In the sample 3GPP2 scenario, the operations of block 206 may involve the HSS sending a Diameter protocol User-Data-Answer (UDA) to the FCS. This UDA may include, for example, a list of application servers to which the FAP is subscribed.

The first network entity receives the response at block 208. The first network entity (e.g., the FCS) thereby identifies at least one application server associated with the access point (e.g., FAP).

As represented by block 210, the first network entity sends registration status information to the identified at least one application server. For example, the first network entity may send a message that informs each application server of the registration or deregistration of the access point or the access terminal.

In the sample 3GPP2 scenario, the operations of block 210 may involve the FCS informing each application server (e.g., that was listed in the user profile of the FAP and with which the FAP has subscribed) as to the status of the FAP registration or the access terminal registration. For example, the FCS may inform each application server that the FAP is IMS registered or that the FAP has deregistered (e.g., according to the determination of block 202).

Figure 3:
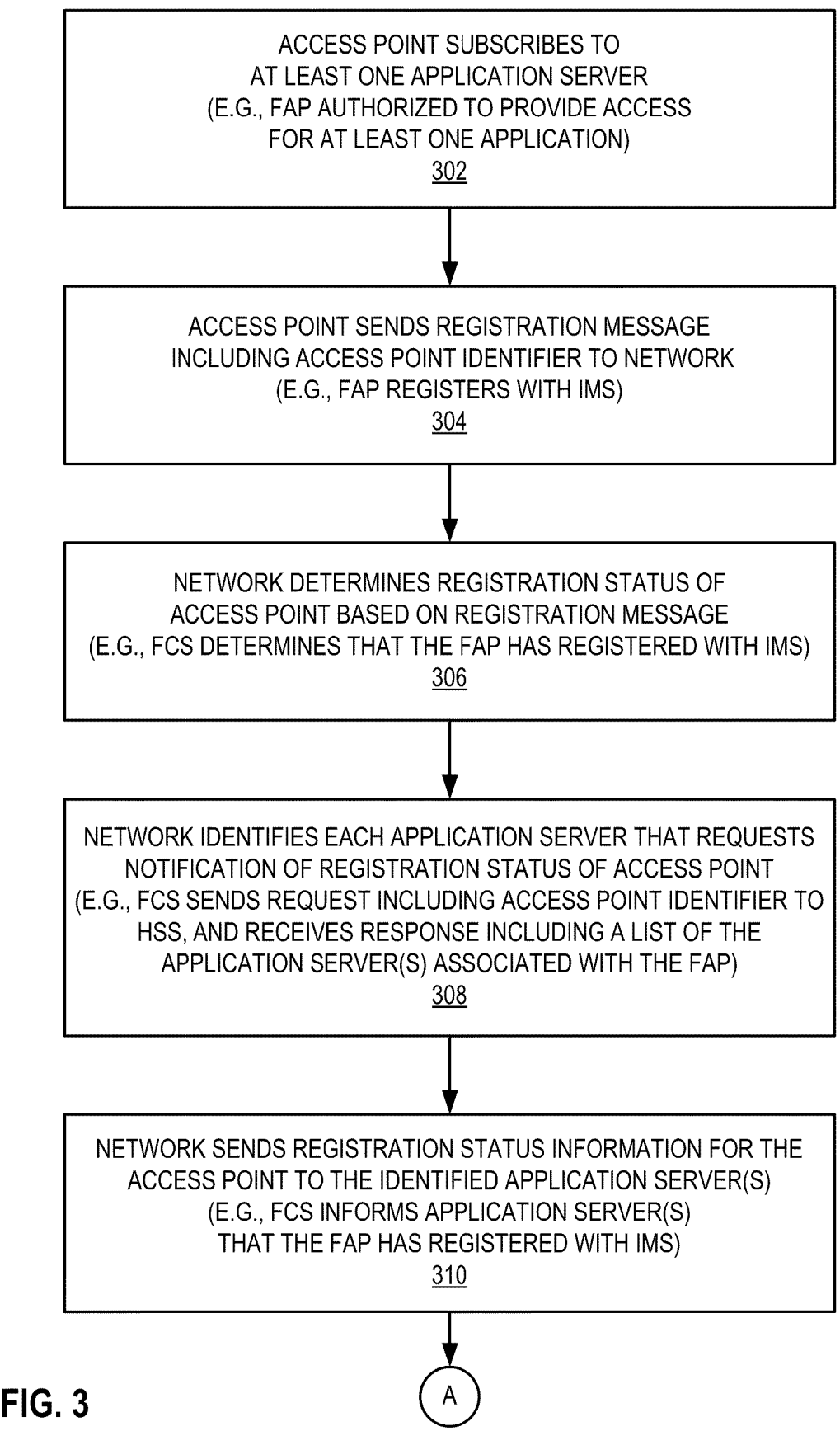
FIGS. 3 and 4 are a flowchart of several sample aspects of operations that may be performed in conjunction with access point registration and deregistration.
Figure 4:
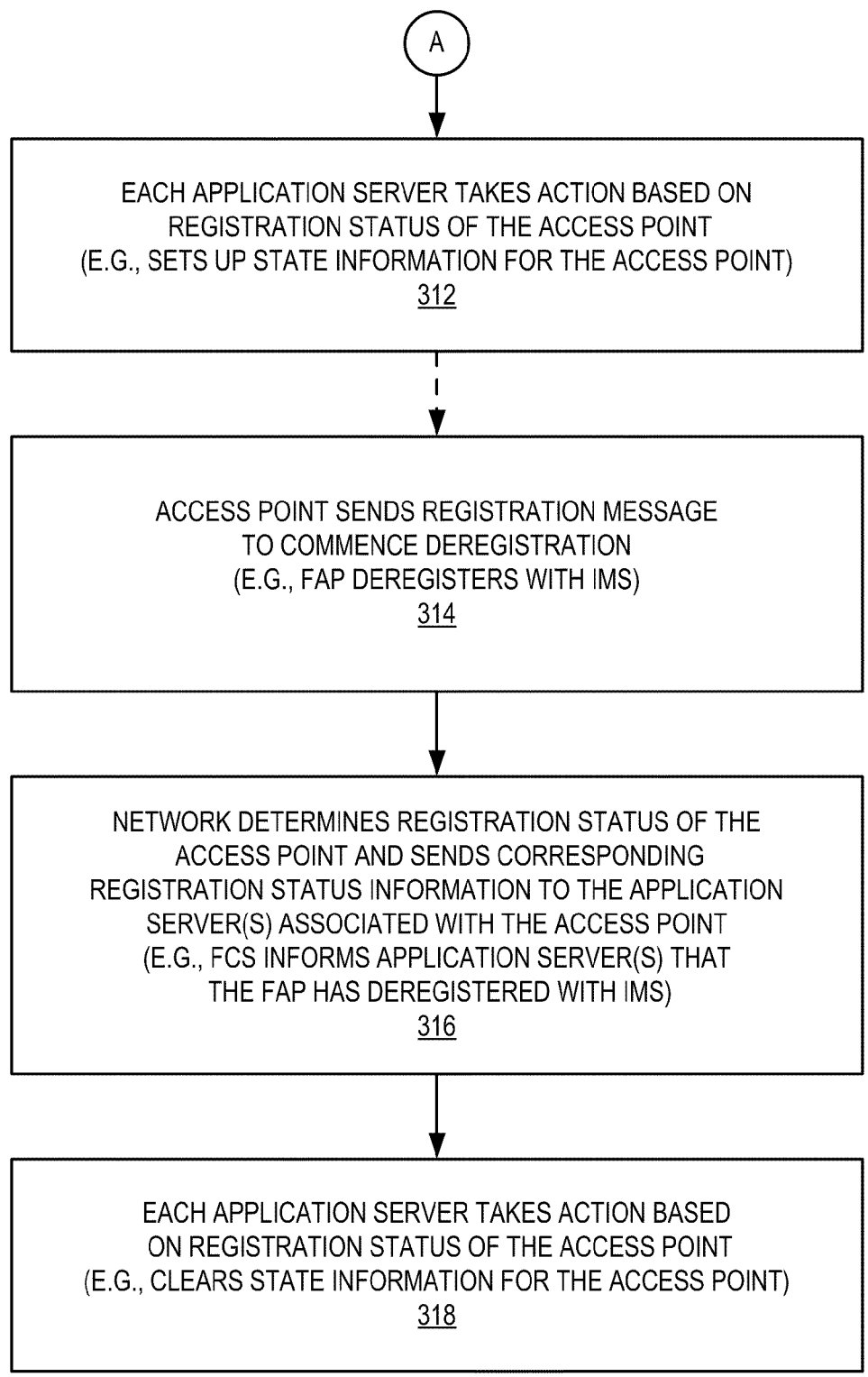

Referring to FIGS. 3 and 4, sample operations that may be performed in conjunction with the registration and deregistration of an access point will be described in more detail. Again, further illustration will be provided with respect to a sample 3GGP2-based system.

As represented by block 302 of FIG. 3, at some point in time, an access point subscribes to at least one application server. For example, when a user purchases a FAP from a network operator, the operator may configure the network and the FAP to provide a set of authorized services via the FAP. Accordingly, the FAP may be authorized to provide access (e.g., to its home access terminals) for at least one application that is served by an application server.

As represented by block 304, at some point in time (e.g., after power-up), the access point sends a registration message including an identifier of the access point to the network. For example, a FAP may send a registration message in conjunction with registering with IMS.

As represented by block 306, the network determines the registration status of the access point based on the registration message. For example, the sending of the registration message by the FAP results in a registration message being sent to the FCS. Based on receipt of this message, the FCS may then determine that the FAP has registered with IMS.

As represented by block 308, the network identifies each application server that requests notification of the registration status of the access point. For example, it is desirable for certain applications to receive information about the registration status of any subscribed access points. Thus, when a given access point is subscribed for a certain application, it may be indicated (e.g., in the corresponding subscription data) that the application is to be notified of any changes in the registration status of the access point. As discussed above at blocks 204-208, an FCS may obtain a list of the application server(s) associated with a FAP by sending a request including a FAP identifier to the HSS.

As represented by block 310, having acquired the application server information, the network sends registration status information for the access point to the identified application server(s). In this example, based on the determination of block 306, the FCS informs the application server(s) that the FAP has registered with IMS.

As represented by block 312 of FIG. 4, an application server that receives this notification takes appropriate action based on the registration status of the access point. For example, the application server may set up state variables and perform other operations to enable the access point to access the application or applications designated by the subscription for the access point.

Subsequently, when an access terminal accesses the access point, the access terminal may be allowed to access the designated application(s) while the access terminal is at that access point. Accordingly, the teachings herein may be employed to support different functionality (as provided by different applications) at different zones (e.g., associated with different FAPs) in a network.

As represented by block 314, at some later point in time, the access point may be deregistered from the network (e.g., a FAP may deregister with IMS). In this case, the access point sends a registration message to the network to commence the deregistration.

As represented by block 316, as a result of receiving this registration message, the network determines the registration status of the access point and sends the corresponding registration status information to the application server(s) associated with the access point. For example, the FCS may inform the application server(s) that the FAP has deregistered with IMS.

In some implementations, a network entity (e.g., the FCS) may maintain a record of information it has previously received regarding which application servers are associated with currently registered access points. Accordingly, in such a case, upon receiving a deregistration message from an access point, the network entity need not again query another network entity (e.g., the HSS) for the application server list. In implementations where the network entity does not save this information, however, the network entity will query the other network entity for the application server list.

As represented by block 318, each application server takes appropriate action based on the new registration status of the access point. For example, the application server may clear state variables and perform other operations to end the access point's access to the designated application or applications.

Figure 5:
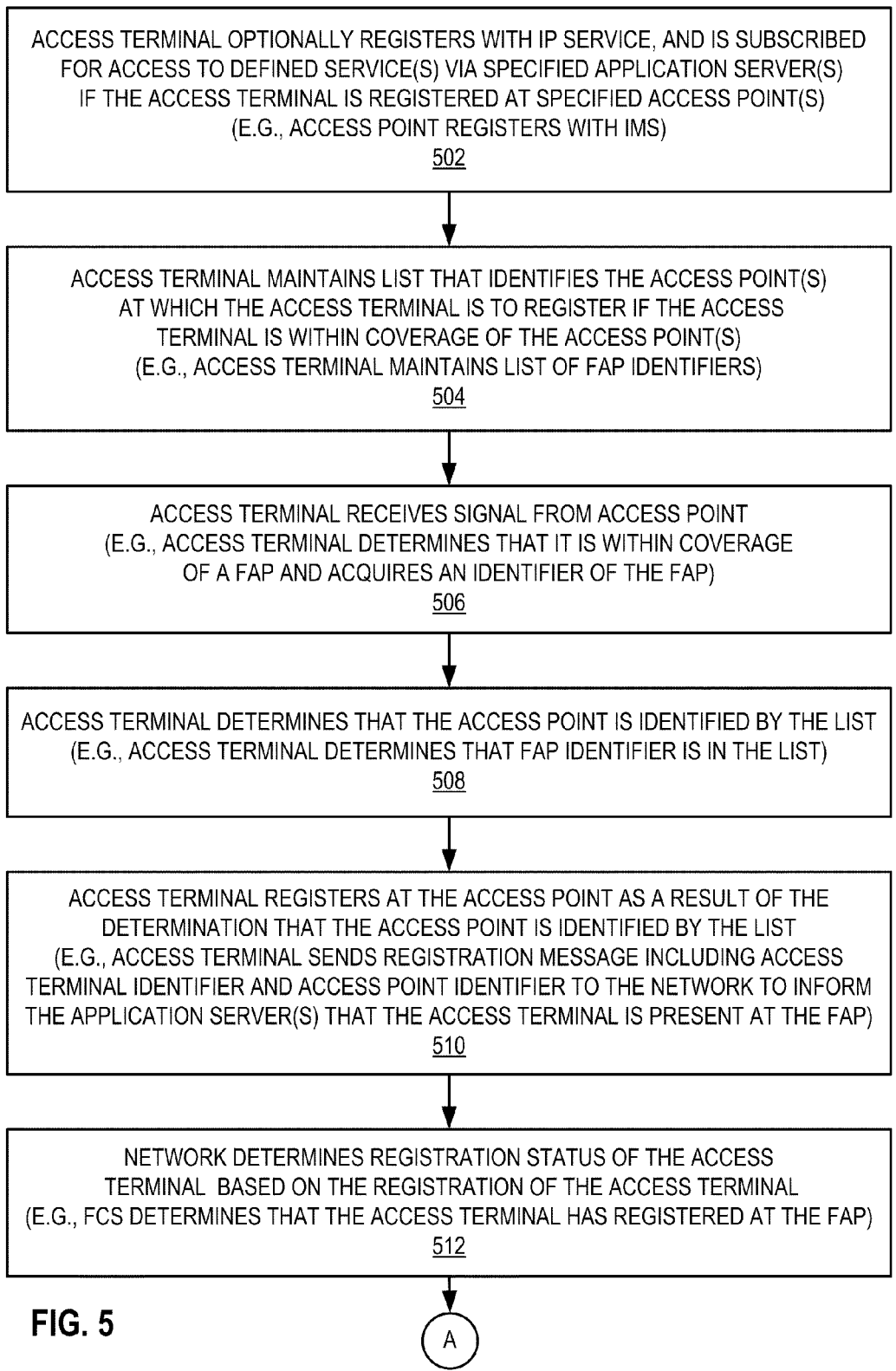
FIGS. 5 and 6 are a flowchart of several sample aspects of operations that may be performed in conjunction with an access terminal registering upon entering coverage of an access point.
Figure 6:
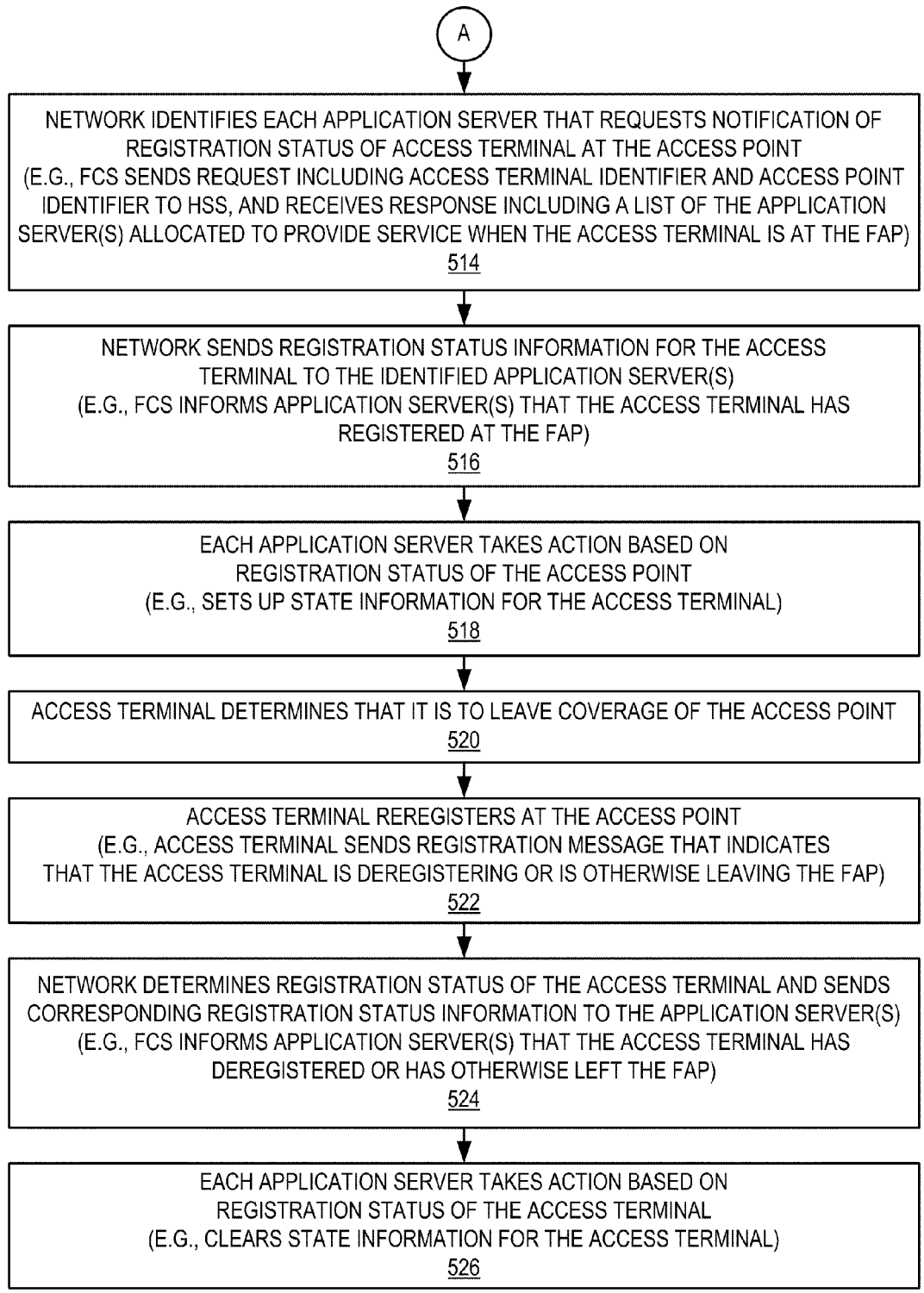

Referring to FIGS. 5 and 6, sample operations that may be performed in conjunction with the registration and deregistration of an access terminal at an access point will be described in more detail. In particular, this example describes an implementation where the access terminal registers with an access point whenever the access terminal determines that it is within the coverage of the access point. Again, further illustration will be provided with respect to a sample 3GGP2-based system.

As represented by block 502 of FIG. 5, in implementations where an access terminal comprises an IMS client, the access terminal registers with an IP service (e.g., IMS) at some point in time. Prior to or in conjunction with this registration, the access terminal is subscribed at the network so that the access terminal may access one or more defined services via one or more specified application servers whenever the access terminal is at one or more specified access points. For example, an owner of a given FAP may authorize a particular access terminal to have access to certain services via that FAP. In this case, the owner may configure the FAP (e.g., via a web interface or some other suitable procedure) and thereby configure the network to provide a set of authorized services for that access terminal via the FAP. Similar authorization procedures may be employed for other FAPs that provide access to the same services and/or other services as well. Accordingly, the access terminal may be subscribed to access different applications that are served by different application servers, whereby the applications available to the access terminal at a given time are dependent on the FAP that is currently serving the access terminal.

In accordance with the teachings herein, to enable an access terminal (e.g., an access terminal that comprises an IMS client or a CS-based access terminal that does not comprise an IMS client) to gain access to the applications associated with a given access point, the access terminal is configured to register whenever it comes within the coverage of one of these access points. To this end, as represented by block 504, the access point maintains a list that identifies the access point(s) at which the access terminal is to register if the access terminal is within the coverage of the access point(s). For example, the access point may maintain a list of FAP identifiers (e.g., cell identifiers).

As represented by block 506, as the access terminal travels throughout a network, the access terminal will receive signals from different access points in the network. For example, the access terminal may receive pilot signals and system information that are broadcast by macro access points and femto access points in the network. In general, these signals may provide an indication as to the type of access points that broadcast the signals and the identities of the access points (e.g., based on the cell identifier and/or other information contained in the signals). Accordingly, based on a received signal, the access terminal may determine that it is within the coverage of a particular type of access point (e.g., a FAP) and acquire an identifier of that access point.

As represented by block 508, the access terminal may then determine whether the access point is identified by the list. For example, the access terminal may determine that a FAP identifier acquired at block 506 is in the list.

As represented by block 510, as a result of the determination that the access point from which the received signal originated is identified by the list, the access terminal registers at that access point. For example, an access terminal with an IMS client may send a registration message to the access point to reregister with IMS. As another example, a CS-based access terminal may send a registration message to register at the access point. In either case, the registration message may include an identifier of the access terminal and an identifier of the access point. By registering in this manner, an access terminal may inform the appropriate application server(s) that the access terminal is present at a particular FAP.

As represented by block 512, the network determines the registration status of the access point based on the registration of the access terminal. For example, the sending of the registration message by the access terminal results in a registration message being sent to the FCS. Based on receipt of this message, the FCS may then determine that the access terminal has registered at a particular FAP.

As represented by block 514 of FIG. 6, the network identifies each application server that requests notification of the registration status of the access terminal. For example, to provide selected services to specified subscribed access terminals at specified access points, it is desirable in some cases for the applications that support those services to receive information about the registration status of those access terminals at those access points. Thus, when a given access terminal is subscribed for a certain application at a certain access point, it may be indicated (e.g., in the corresponding subscription data) that the application is to be notified of any changes in the registration status of the access terminal at that access point. As discussed above at blocks 204-208, an FCS may obtain a list of the application server(s) associated with a given access terminal and FAP combination by sending a request including a corresponding FAP identifier and access terminal identifier to the HSS.

As represented by block 516, having acquired the application server information, the network sends registration status information for the access terminal to the identified application server(s). For example, based on the determination of block 512, the FCS informs the application server(s) that that an access terminal has registered at a particular FAP.

As represented by block 518, an application server that receives this notification takes appropriate action based on the registration status of the access terminal. For example, the application server may set up state variables and perform other operations to enable the access terminal to access the application or applications designated by the subscription for the access terminal as long as the access terminal is at the access point. Again, the teachings herein thus provide an efficient mechanism for supplying different functionality for access terminals at different zones in a network.

As represented by block 520, at some later point in time, the access terminal determines that it is to leave the coverage of the access point. For example, the access terminal may make this determination based on lower layer measurements, or may have been informed by the network that a handover to another access point is warranted.

Accordingly, as represented by block 522, the access point reregisters at the access point to commence the deregistration process. For example, the access terminal may send a registration message that indicates that the access terminal is deregistering or that provides some other indication that the access terminal is leaving the access point.

As represented by block 524, as a result of receiving this registration message, the network determines the new registration status of the access point and sends the corresponding registration status information to the application server(s) associated with the access point. For example, the FCS may inform the application server(s) that the access terminal has deregistered at a particular FAP.

Again, in some implementations, a network entity (e.g., the FCS) may maintain a record of information it has previously received regarding which application servers are associated with currently registered access points and access terminals. Accordingly, in such a case, upon receiving a message indicating that the access terminal is deregistering or leaving, the network entity need not again query another network entity (e.g., the HSS) for the application server list. In implementations where the network entity does not save this information, however, the network entity will query the other network entity for the application server list.

As represented by block 526, each application server takes appropriate action based on the new registration status of the access point. For example, the application server may clear state variables and perform other operations to end the access terminal's access to the designated application or applications at the current access point.

Referring now to FIGS. 7-12, several more specific examples of how the concepts taught herein may be employed will be described in the context of a 3GPP2-based system. FIG. 7 is an example of a 3GPP2-based system 700 that illustrates how a femto zone may be deployed in a network. FIGS. 8-12 are sample call flows that illustrate different techniques that may be used, for example, to facilitate the deployment of femto zones in a network.

Referring initially to FIG. 7, the system 700 illustrates examples of a femto zone 702, a femto network 704, and a macro network 706. Here, access terminals AT1 and AT2 (e.g., mobile stations, UEs, etc.) may acquire network connectivity via a cdma2000 1x base station (BS) or access network (AN) of the macro network 706 or a FAP of the femto zone 702. It should be appreciated that an actual network will generally include many more BSs, ANs, and FAPs. The macro network 706 illustrates several conventional components for providing high rate packet data (HRPD) access and voice access and will not be discussed further.

The femto zone 702 provides access via the FAP to local and network-based services. For example, the FAP provides local IP access (LIPA) to an IP network (e.g., a local area network at a FAP owner's home or business). In addition, the FAP is connected to a security gateway (SeGW) that provides security functions for FAP access to the femto network 704. Here, the access terminals may acquire access to various types of femto network services such as HRPD access, voice access, and one or more application servers.

The application servers may be implemented in various ways in different implementations. For example, an application server may be deployed within a femto network or a core network, whereby access to the application server is potentially available to any entity operating within these networks. Also, an application server may be a local application server that is associated with, for example, a particular femto zone, a particular femto network, or some other local zone or area. In the example of FIG. 7, the femto network 704 supports IMS whereby the access terminals may gain access to one or more application servers 708 or other IP services via the FAP. In addition, the access terminals may gain access to one or more local application servers 710 via the FAP.

Sample operations of several of the components of the femto network 704 are described in the call flows of FIGS. 8-12 that follow. Accordingly, these components will be briefly described here. A femto convergence server (PCS) is an application server that provides interworking between the FAP, the session initiation protocol (SIP) environment of IMS, and MAP network elements of the macro network 706. IMS includes a call session control function (CSCF) that includes the following functions: proxy-CSCF (P-CSCF), interrogating-CSCF (I-CSCF), and serving-CSCF (S-CSCF). In FIG. 7, the home subscriber server (HSS) is shown as being included in IMS. The HSS need not be implemented in this manner, however.

In accordance with the teachings herein, a femto zone allows a user to be recognized as being at a particular femto access point. The concept of a device's presence in a zone therefore relates to the ability to determine whether a device (e.g., an access terminal) subscribing to a presence service has entered, is currently under, has left, or is not under FAP coverage. The call flows that follow serve to illustrate how the IMS framework may be leveraged to provide an IMS application server with presence in a zone information. For example, as discussed herein, an IMS application server may be informed when an access point or access terminal registers or deregisters or informed whether an access terminal is within the coverage of an access point.

Figure 8:
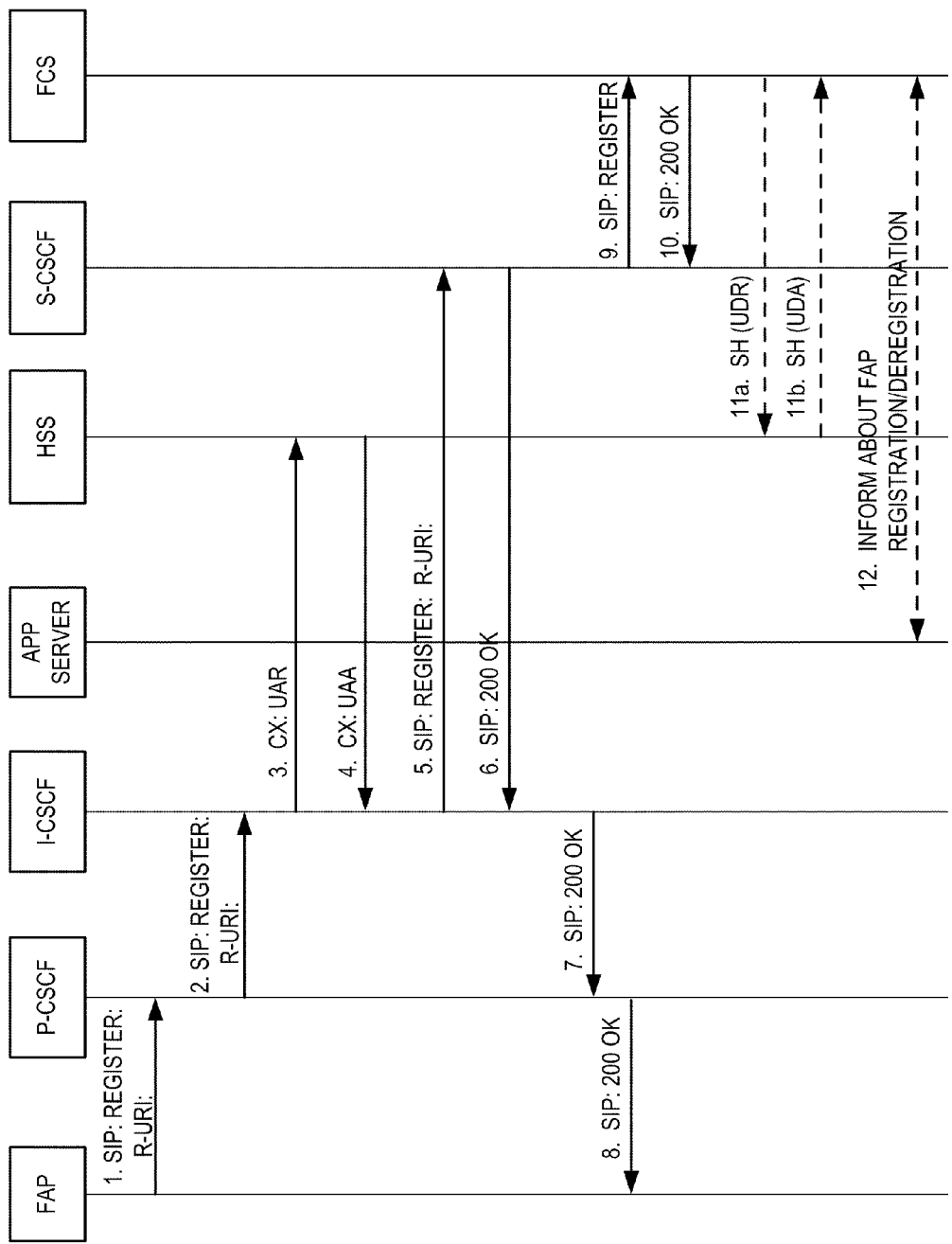
FIG. 8 is a simplified diagram illustrating sample call flow associated with femto access point registration.

FIG. 8 illustrates sample call flow for a scenario where an application server is informed whenever a FAP registers or deregisters with IMS. In particular, this call flow describes registration of a FAP SIP client with IMS. At the end of this call flow, the FAP SIP client may be fully registered with IMS and may, therefore, act on behalf of cdma2000 1x mobiles that attach to the FAP. Here, the IMS HSS is provisioned with the femto user agent (UA) subscriptions.

In general, steps 1-10 of FIG. 8 relate to registering the FAP with IMS. At step 1 (e.g., upon power-up of the FAP), the FAP sends a SIP REGISTER request to the P-CSCF. At step 2, the P-CSCF sends the SIP REGISTER request to the I-CSCF. At step 3, the I-CSCF sends a Cx: UAR to the HSS to obtain an S-CSCF address. At step 4, the HSS replies with Cx: UAA indicating the requested S-CSCF address. At step 5, the I-CSCF forwards the SIP REGISTER request to the S-CSCF. Upon verifying the credentials of the FAP obtaining any required information (e.g., obtaining user profile information from the HSS), the S-CSCF sends a SIP 200 (OK) to the I-CSCF at step 6. The SIP 200 is forwarded back to the FAP at steps 7 and 8. At step 9, the S-CSCF sends a $3^{rd}$ Party registration request (SIP: REGISTER request) to the FCS. Thus, the FCS is provided with the identity of the FAP. At step 10, the FCS responds with a SIP 200 (OK).

In general, steps 11-12 of FIG. 8 relate to informing the application server (APP SERVER) of the registration status of the FAP. At step 11a, as a result of receiving the registration message of step 9 (indicating the registration of the FAP), the FCS sends a User-Data-Request to the HSS to request the FAP-related user data. At step 11b, the HSS sends a User-Data-Answer that includes the application server list for the FAP. At step 12, the FCS informs the application server of the registration status of the FAP.

The call flow of FIG. 8 is applicable to either the registration of the FAP or the deregistration of the FAP. For registration of the FAP, the message of step 1 indicates that the FAP is registering. Thus, the SIP messages of steps 6-8 confirm the registration. In addition, the message of step 9 indicates that the FAP is registering. In this case, the message of step 12 informs the application server that the FAP has registered with IMS.

Conversely, for deregistration of the FAP, the message of step 1 indicates that the FAP is deregistering (e.g., based on an appropriate indication in the message). Thus, the SIP messages of steps 6-8 confirm the deregistration. The message of step 9 also indicates that the FAP is deregistering (e.g., based on an appropriate indication in the message). For deregistration, the FCS may not need to perform steps 11a and 11b since it may maintain the previously acquired application server list as discussed above. In addition, in this case, the message of step 12 informs the application server that the FAP has deregistered with IMS.

FIGS. 9-12 illustrate sample scenarios where the access terminals register/reregister whenever they enter/leave coverage of an access point that has a FAP ID or CELL ID matching an entry in predefined femto zone database. Here, the services received by an access terminal at a given access point (via a particular application server) are dependent on the user's subscriptions. Accordingly, the services available to an access terminal may be different at different user locations (e.g., at a first femto access point, a second femto access point, or a macro access point).

To facilitate such an access scheme based on an access terminal's presence in particular zone, the network is configured to notify certain application servers when a given access terminal registers at a particular access point. For example, upon registration of an access terminal, the cell identifier information for the serving access point is included in the P-Access-Network-Info field in the SIP header. Upon obtaining the location information of an access terminal (e.g., the access point where the access terminal registered), the IMS network may provide this information to an appropriate application server via third party registration, registration event package, or any other proprietary means. Therefore, any application which is interested in the access terminal's location may receive this information and adjust its services accordingly.

Figure 9:
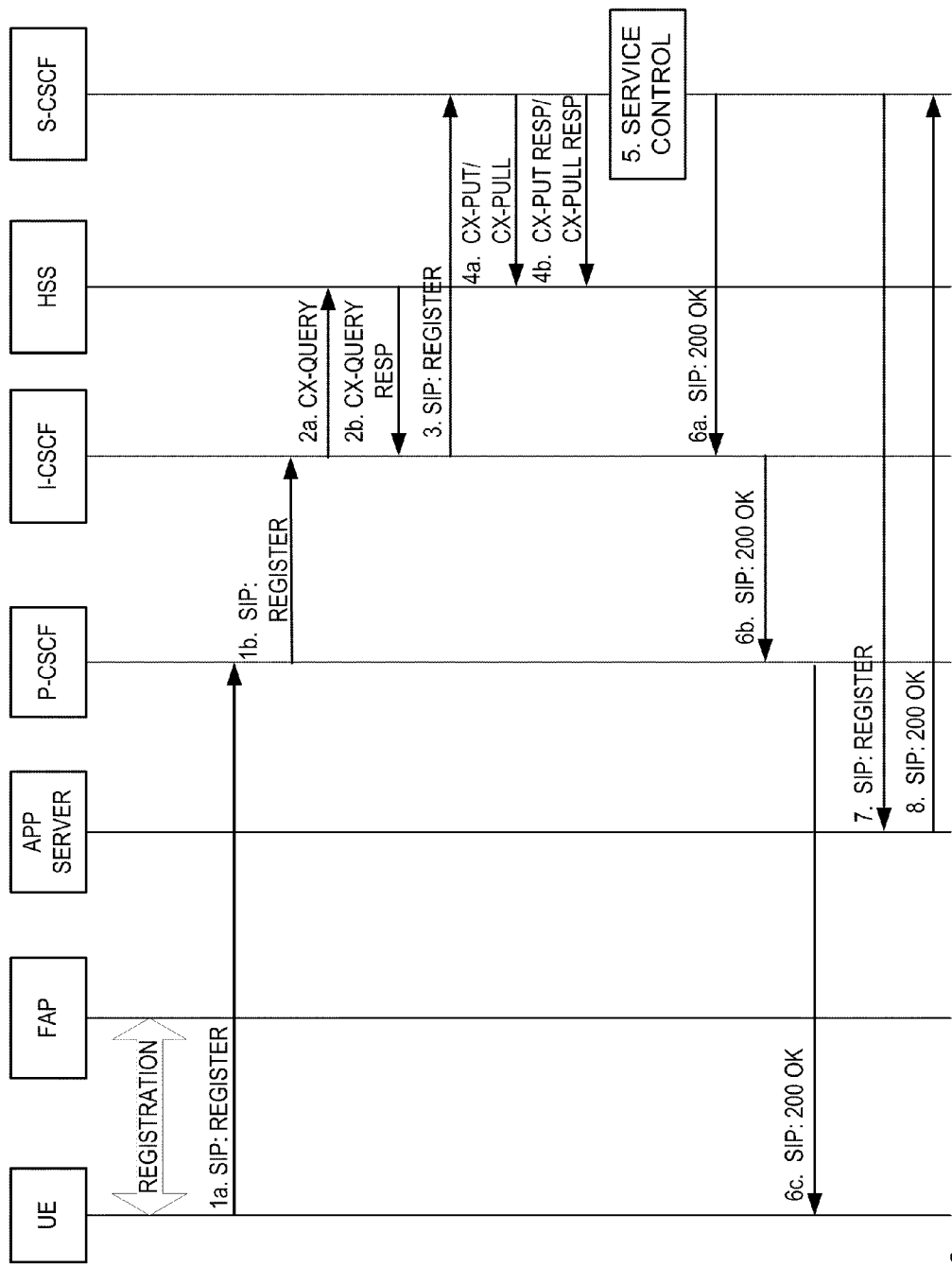
FIG. 9 is a simplified diagram illustrating sample call flow associated with registration of an IMS registered access terminal.
Figure 10:
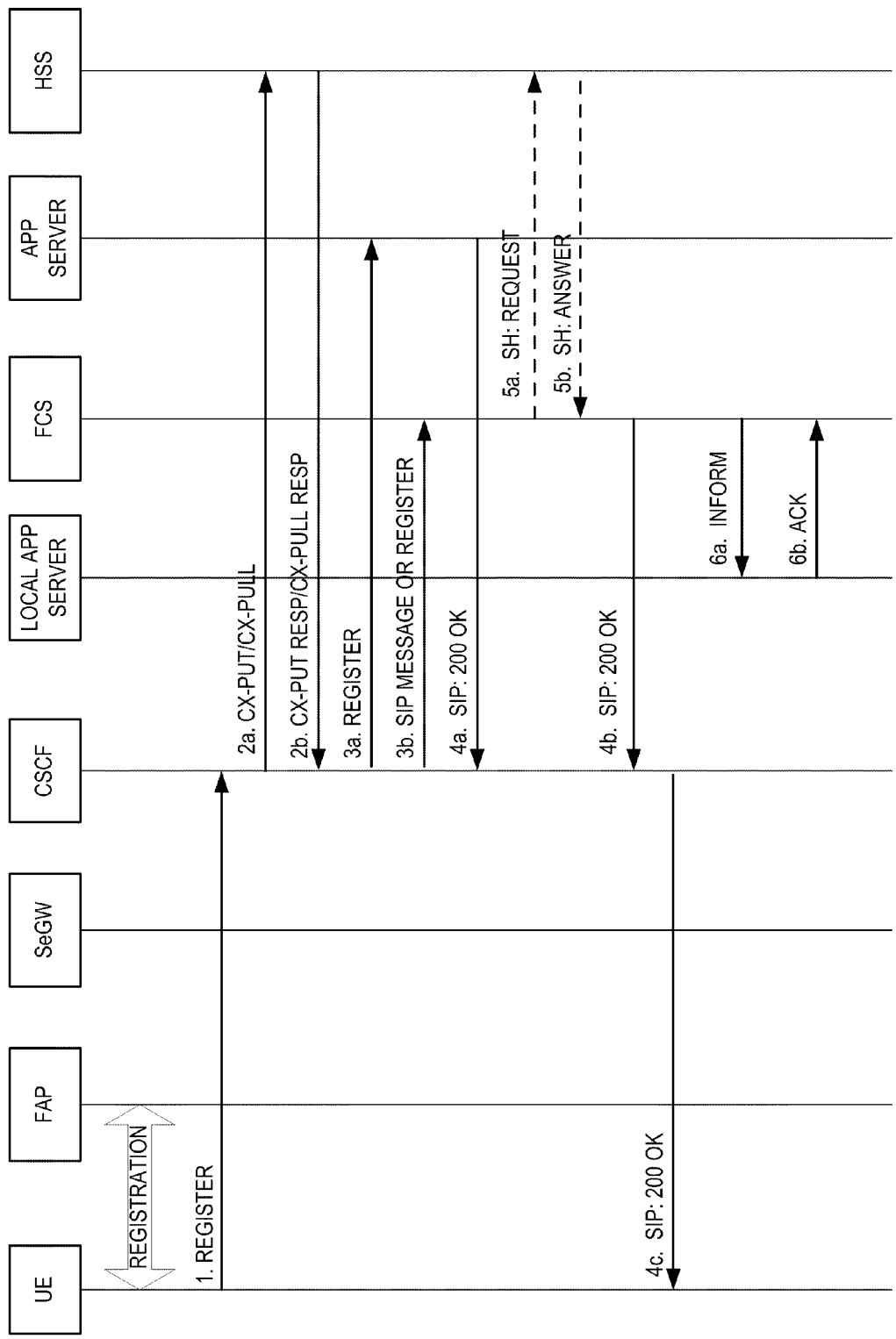
FIG. 10 is a simplified diagram illustrating sample call flow associated with registration of an IMS registered access terminal.

The call flows of FIGS. 9 and 10 are directed to examples where the access terminal has an IMS client such that the SIP: REGISTER request is sent by the access terminal. Here, the UE (access terminal) is IMS registered and over time moves from one location to another. During this move, the UE is always IMS registered. When UE is at the first location, the UE checks the FAP ID and the CELL ID. If the UE determines that the FAP ID or the CELL ID matches an entry in a femto zone database, the UE will IMS reregister and provide location information and any other pertinent data to the IMS network.

Referring initially to FIG. 9, the SIP: REGISTER is triggered as a result of the UE registering on a FAP with a specified CELL ID (i.e., a CELL ID that is in the database). Here, initial Filter Criteria (iFC) maintained by the HSS comprise a set of triggers that match receipt of a SIP message with a particular application server. For femto zones, the HSS is updated with the iFC for the service as part of the UE's IMS service profile. When the S-CSCF receives the iFC in step 4b, if the CELL ID in the SIP header matches the iFC, the S-CSCF is triggered to notify the appropriate application server that the UE is under the FAP.

In general, steps 1-3 and 6 of FIG. 9 relate to registering the UE. This call flow assumes that the UE has already IMS registered. At step 1a, the UE arrives at the FAP and recognizes that the CELL ID matches an entry in the femto zone database. The UE sends a SIP: REGISTER message to the P-CSCF, with the FAP CELL ID in the SIP header. At step 1*b*, the P-CSCF forwards the SIP: REGISTER message to the I-CSCF. At steps 2*a* and 2*b*, the I-CSCF sends a Cx-Query to the HSS to obtain the S-CSCF and receives a Cx-Query Response. At step 3, the I-CSCF forwards the SIP: REGISTER message to the S-CSCF. At steps 4*a* and 4*b*, the S-CSCF registers the UE with the HSS and obtains the iFC as discussed above. At step 5, the S-CSCF performs service control. At steps 6*a*-6*c*, the S-CSCF sends a SIP 200 (OK) to the FAP via the I-CSCF and the P-CSCF.

In general, steps 7 and 8 of FIG. 9 relate to informing the application server (APP SERVER) of the registration status of the access terminal. At step 7, based on the iFC received from the HSS in step 4*b*, the S-CSCF determines the application(s) requesting notification of the UE's presence under the FAP, and sends a $3^{rd}$ Party SIP: REGISTER to the application server. The application server is thus provided with information indicative of the location of the UE. Here, as an application is requesting notification of the UE's presence under the FAP, the application server has already been notified that the FAP is registered with IMS. At step 8, the application server responds with a SIP: 200 (OK).

Also, as discussed above, the UE is configured to reregister both when entering and leaving the FAP so that the UE may access designated applications inside and outside of the femto access point coverage. Here, deregistration may employ operations similar to those described for registration in FIG. 9 (e.g., as described above in conjunction with FIG. 8). To avoid ping-ponging registrations, the reregistration may be delayed in time (e.g., through an appropriate hysteresis scheme) when the access terminal is at the boundaries of cells.

FIG. 10 illustrates an example where a UE may access applications served by a local application server. In this example, the FCS communicates with the local application servers since these servers are not globally known (e.g., in the HSS).

In general, steps 1-2 and 4 of FIG. 10 relate to registering the UE. This call flow also assumes that the UE has already IMS registered. At step 1, the UE arrives at the FAP and recognizes that the CELL ID matches an entry in the femto zone database. The UE sends a REGISTER message to the CSCF, with the FAP CELL ID in the SIP header. At step 2, the S-CSCF registers the UE with the HSS. Here, the user is authorized to access any macro applications (e.g., served by the non-local application server) to which the user is subscribed. Authorization for local applications (e.g., served by the local application server) also may be authorized at this step. At steps 3*a* and 3*b*, the S-CSCF $3^{rd}$ Party registers on behalf of the UE to the non-local application server and the FCS, respectively. At step 4, the S-CSCF returns a SIP 200 (OK) to the UE upon receiving acknowledgements from the application server and the FCS.

In general, steps 5 and 6 of FIG. 10 relate to informing the local application server of the registration status of the access terminal. At step 5, the FCS populates a Diameter Request to fetch the list of application servers based on the FAP identity and subscription data. The HSS responds to the FCS with a Diameter Answer. Step 5 may be conditional if step 3B is a SIP message triggered based on the PANI header, CELL ID or any other identifier that indicates that the UE is within the coverage of the FAP. In this case, the authorization for the local (e.g. femto) applications has not been performed. At step 6, the FCS informs the local application server of the UE registration.

Again, the UE is configured to reregister both when entering and leaving the FAP so that the UE may access designated applications inside and outside of the FAP coverage. As discussed above, deregistration may employ operations similar to those described for registration. In addition, ping-ponging mitigation techniques may be employed at cell boundaries.

Figure 11:
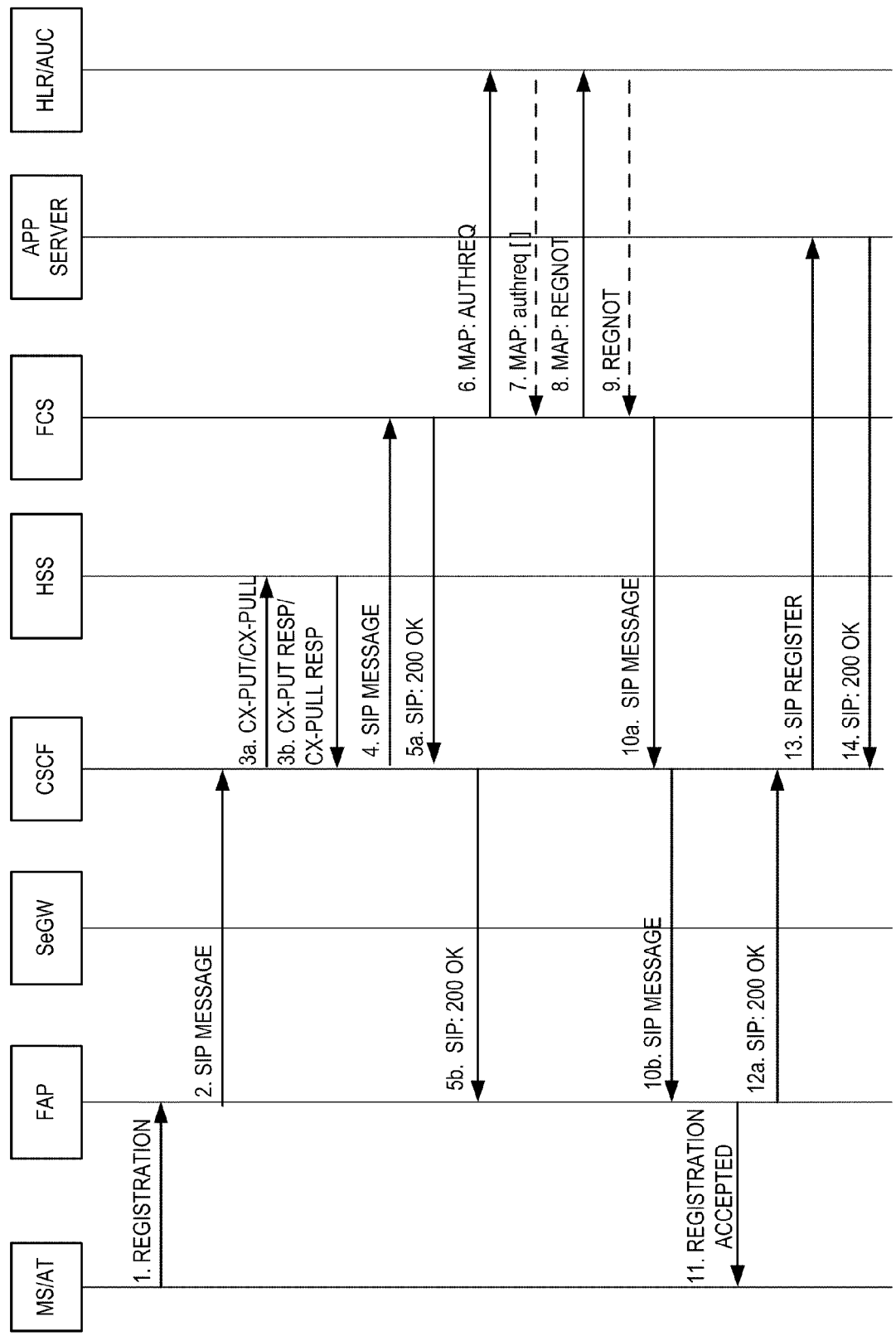
FIG. 11 is a simplified diagram illustrating sample call flow associated with registration of a 1x-CS access terminal.
Figure 12:
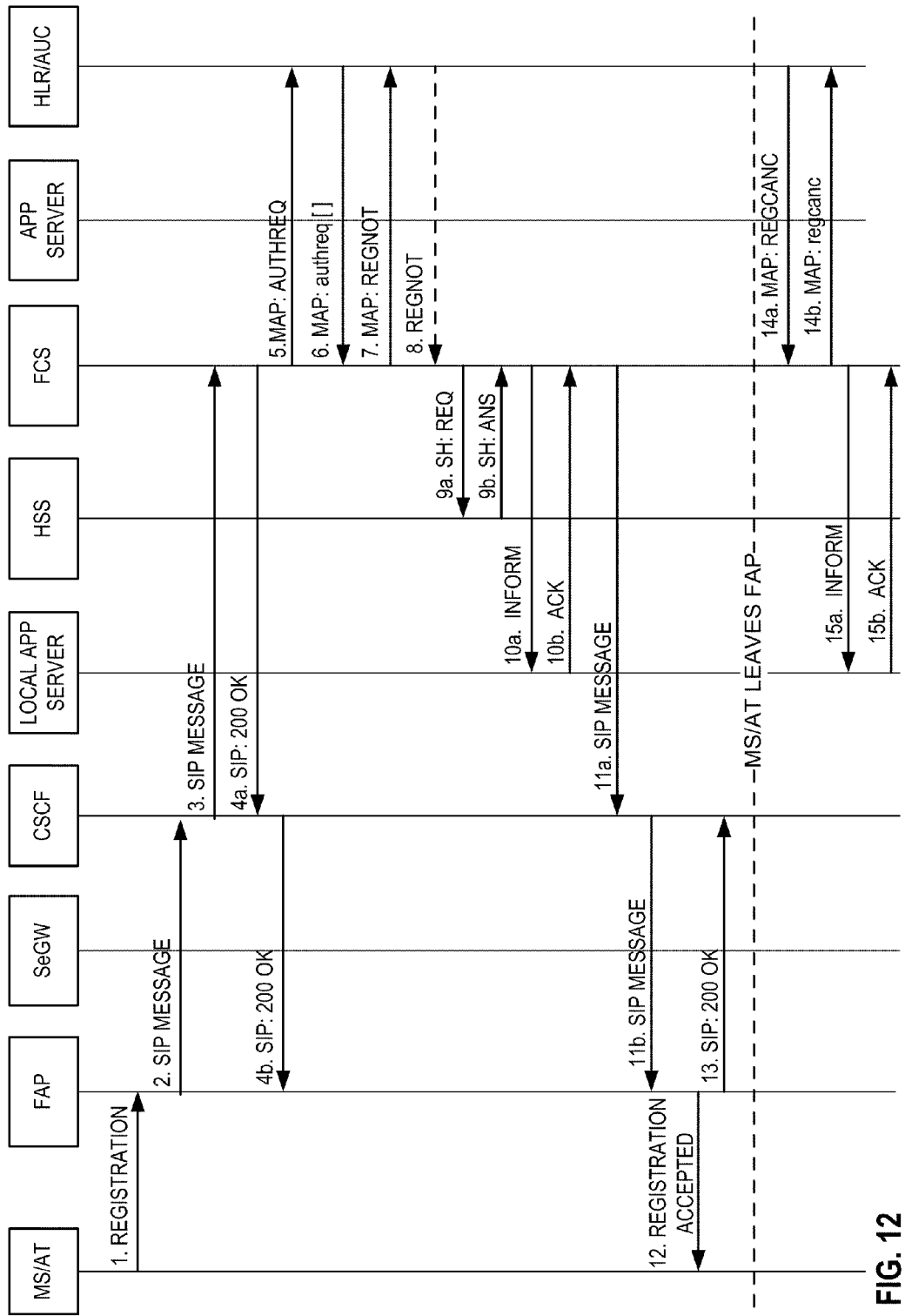
FIG. 12 is a simplified diagram illustrating sample call flow associated with registration of a 1x-CS access terminal.

FIGS. 11 and 12 are directed to examples where the access terminals are 1x CS (circuit switched) users. In this case, the FAP sends the SIP: REGISTER request to the FCS upon registration by the access terminal. If the access terminal is CS registered to a FAP and changes location, the access terminal will CS-deregister from that FAP and move towards the new FAP to which it eventually CS registers. The new FAP will then register on behalf of the access terminal by sending a SIP MESSAGE to the network with FAP packages CDMA registration data (e.g., IMSI, MEID/ESN, AUTHR, RAND, RANDC, etc.) addressed to the FCS, thereby providing the access terminal's location information (e.g., the CELL ID of the FAP) to the IMS network.

Referring to FIG. 11, the CSCF is configured such that the SIP MESSAGE triggers an initial Filter Criteria (iFC) retrieval at the HSS. The FAP includes its CELL ID in the construction of the SIP message as discussed above. Thus, the CSCF determines the application(s) to notify of the presence of the mobile station or access terminal (MS/AT) under the FAP by matching the SIP header with the iFC. The HSS is updated with the IFC for the service as part of the MS/AT's service profile.

At step 1, the MS/AT registers with the FAP including the global challenge response. At step 2, the FAP packages CDMA registration data in a SIP MESSAGE addressed to the FCS. The FAP includes its CELL ID in the MESSAGE. The MESSAGE is sent via P-CSCF to the S-CSCF (not shown). At step 3, the S-CSCF registers the MS/AT with the HSS. At step 4, the S-CSCF sends the MESSAGE to the FCS as designated by the filter criteria. Although the MESSAGE is addressed to a generic address for the FCS, filter criteria allows that the same FCS is used for all messaging to/from a particular FAP. At step 5, the FCS responds to the MESSAGE with a SIP 200 (OK) which is routed back to the FAP. At step 6, the FCS populates an AuthenticationRequest with the CDMA authentication data provided by the MS/AT and sent by the FAP in the MESSAGE. At step 7, the Authentication Center (AuC) returns a response, assuming successful authentication, the scenario continues. If authentication fails, the FCS signals a registration denied to the FAP. At step 8, the FCS populates a REGNOT with the FCS MSCID as the serving MSC and sends it to the HLR. At step 9, the HLR responds to the FCS and if the registration is allowed and successful, the scenario continues and the FCS stores the subscriber VLR data and the serving FAP information in local data. If the registration fails, the FCS signals a registration denied to the FAP. At step 10, assuming authentication and registration success, the FCS signals registration complete to the serving FAP via a SIP MESSAGE. Included in the SIP MESSAGE is the MS directory number for the registering CDMA device. At step 11, the FAP signals a successful registration to the MS/AT. At step 12, the FAP responds to the MESSAGE with SIP 200 (OK). At step 13, based on the iFC from the HSS received in step 3, the S-CSCF determines the application(s) requesting notification of the MS/AT's presence under the FAP and sends a third-party REGISTER to the application server. At step 14, the application server returns a 200 OK.

Through the use of the techniques of FIG. 11, a 1x-CS user may use IMS networks and its applications (e.g., supplementary services) by using a legacy handset. This involves, however, providing each CS user with a user profile in the HSS. In addition, the third party registration is triggered by the incoming SIP MESSAGE in step 2. Currently, this is not specified in TS 24.229. However, step 4 may be interpreted as a part of the filter criteria which is always triggered when step 2 occurs.

FIG. 12 illustrates an example where an MS/AT may access applications served by a local application server. This example also illustrates the case where the application service is informed when the MS/AT leaves the FAP.

At step 1, the MS/AT registers with the FAP including the global challenge response. At step 2, the FAP packages CDMA registration data (e.g., IMSI, MEID/ESN, AUTHR, RAND, RANDC) in a SIP MESSAGE method addressed to the FCS. The FAP includes its Cell ID in the SIP MESSAGE (in the Access-info in P-Access-Network-Info header). The MESSAGE is sent via P-CSCF to the S-CSCF. At step 3, the S-CSCF sends the MESSAGE to the FCS as designated by the filter criteria. Although the MESSAGE is addressed to a generic address for the FCS, filter criteria allows that the same FCS is used for all messaging to/from a particular FAP. At step 4, the FCS responds to the MESSAGE with a SIP 200 (OK) which is routed back to the FAP. At step 5, the FCS populates an AuthenticationRequest with the CDMA authentication data provided by the MS/AT and sent by the FAP in the MESSAGE. At step 6, the Authentication Center (AuC) returns a response, assuming successful authentication, the scenario continues. If authentication fails, the FCS signals a registration denied to the FAP. At step 7, the FCS populates a REGNOT with the FCS MSCID as the serving MSC and sends it to the HLR. At step 8, the HLR responds to the FCS and if the registration is allowed and successful, the FCS stores the subscriber VLR data and determines the application servers based on FAP identity and subscription data. At step 9, the FCS populates a Diameter Request to fetch the list of application servers based on the FAP identity and subscription data. The HSS responds to the FCS with a Diameter Answer. At step 10, the FCS informs the application servers which the 1x-CS user has subscribed to, about the user registration to the Femto network. At step 11, assuming authentication and registration success, the FCS signals registration complete to the serving FAP via a SIP MESSAGE. Included in the SIP MESSAGE is the MS directory number for the registering CDMA device. At step 12, the FAP signals a successful registration to the MS/AT. At step 13, the FAP responds to the MESSAGE with SIP 200 (OK). At step 14, when the MS/AT leaves the FAP, the HLR informs the FCS. At step 15, the FCS informs the local application servers about the MS/AT left the FAP.

Through the use of the techniques of FIG. 12, a 1x-CS user within FAP coverage may use 1x-CS applications (e.g., supplementary services). Moreover, in this case, a CS user does not need to be provided with a user profile in the HSS.

The techniques described herein may be implemented in a variety of ways in different implementations. For example, the teachings herein may be employed in different types of networks (e.g., other than 3GPP2). Also, different types of messages (e.g., other than the Diameter protocol) may be employed to obtain application server information, inform an application server about registration status, and so on. In addition, in some implementations, the network entity (e.g., the FCS) that determines the registration status of the access point and/or access terminal also maintains the application server list. Thus, in this case, the network entity does not need to acquire the application server list from another network entity (e.g., the HSS).

FIG. 13 illustrates several sample components (represented by corresponding blocks) that may be incorporated into nodes such as an access terminal 1302 and a network entity 1304 (e.g., corresponding to the access terminal 102 and the network entity 106, respectively, of FIG. 1) to perform registration-related operations as taught herein. The described components also may be incorporated into other nodes in a communication system. For example, other nodes in a system may include components similar to those described for the access terminal 1302 and the network entity 1304 to provide similar functionality. Also, a given node may contain one or more of the described components. For example, an access terminal may contain multiple transceiver components that enable the access terminal to operate on multiple frequencies (e.g., operate on different frequency bands associated with different nominal carrier frequencies) and/or communicate via different technologies.

As shown in FIG. 13, the access terminal 1302 includes a transceiver 1306 for communicating with other nodes. The transceiver 1306 may include one or more transmit chains each of which includes a transmitter 1308 for sending signals (e.g., messages, indications), and one or more receive chains each of which includes a receiver 1310 for receiving signals (e.g., messages, indications, pilot signals).

The network entity 1304 includes a network interface 1312 for communicating with other nodes (e.g., network entities). For example, the network interface 1312 may be configured to communicate with one or more network entities via a wire-based or wireless backhaul. In some aspects, the network interface 1312 may be implemented as a transceiver (e.g., including transmitter and receiver components) configured to support wire-based or wireless communication. Accordingly, in the example of FIG. 13, the network interface 1312 is shown as comprising a transmitter 1314 for transmitting signals (e.g., messages, requests) and a receiver 1316 for receiving signals (e.g., messages, responses).

The access terminal 1302 and the network entity 1304 also include other components that may be used in conjunction with registration-related operations as taught herein. For example, the access terminal 1302 may include an access controller 1318 for performing registration-related operations and other access-related operations (e.g., determining that an access point is identified by the list, registering at the access point, accessing at least one defined service, determining that the access terminal is to leave coverage, deregistering at the access point) and for providing other related functionality as taught herein. Similarly, the network entity 1304 may include a registration controller 1320 for performing registration-related operations (e.g., invoking a request for user data relating to an access point, processing a response that identifies at least one application server, sending registration status information to at least one application server, determining that there has been a change in the registration status of the access point, determining that there has been a change in the registration status of the access terminal) and for providing other related functionality as taught herein. The access terminal 1302 and the network entity 1304 also may include communication controllers 1322 and 1324, respectively, for controlling communications (e.g., sending and receiving messages) and for providing other related functionality as taught herein. Also, the access terminal 1302 and the network entity 1304 include memory components 1326 and 1328 (e.g., each including a memory device), respectively, for maintaining information (e.g., identifiers, a list that identifies at least one access point, registration status information).

For convenience the access terminal 1302 and the network entity 1304 are shown in FIG. 13 as including components that may be used in the various examples described herein. In practice, the functionality of one or more of these blocks may be different in different embodiments. For example, the functionality of block 1318 may be different in a deployment implemented according to FIG. 10 as compared to a deployment implemented according to FIG. 12.

The components of FIG. 13 may be implemented in various ways. In some implementations the components of FIG. 13 may be implemented in one or more circuits such as, for example, one or more processors and/or one or more ASICs (which may include one or more processors). Here, each circuit (e.g., processor) may use and/or incorporate data memory for storing information or executable code used by the circuit to provide this functionality. For example, some of the functionality represented by block 1306 and some or all of the functionality represented by blocks 1318 and 1322 may be implemented by a processor or processors of an access terminal and data memory of the access terminal (e.g., by execution of appropriate code and/or by appropriate configuration of processor components). Similarly, some of the functionality represented by block 1312 and some or all of the functionality represented by blocks 1320 and 1324 may be implemented by a processor or processors of a network entity and data memory of the network entity (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 14:
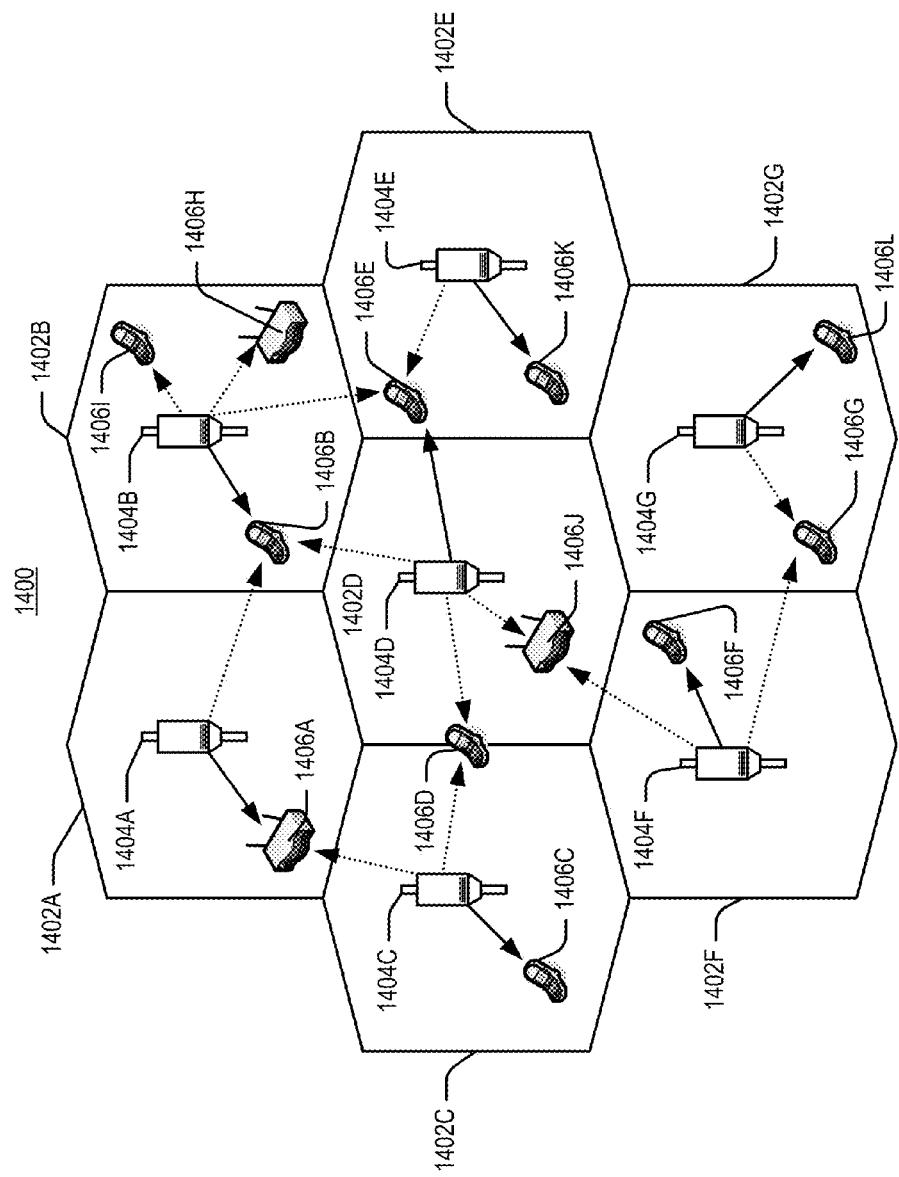
FIG. 14 is a simplified diagram of a wireless communication system.

FIG. 14 illustrates a wireless communication system 1400, configured to support a number of users, in which the teachings herein may be implemented. The system 1400 provides communication for multiple cells 1402, such as, for example, macro cells 1402A-1402G, with each cell being serviced by a corresponding access point 1404 (e.g., access points 1404A-1404G). As shown in FIG. 14, access terminals 1406 (e.g., access terminals 1406A-1406L) may be dispersed at various locations throughout the system over time. Each access terminal 1406 may communicate with one or more access points 1404 on a forward link (FL) and/or a reverse link (RL) at a given moment, depending upon whether the access terminal 1406 is active and whether it is in soft handoff, for example. The wireless communication system 1400 may provide service over a large geographic region. For example, macro cells 1402A-1402G may cover a few blocks in a neighborhood or several miles in a rural environment.

Figure 15:
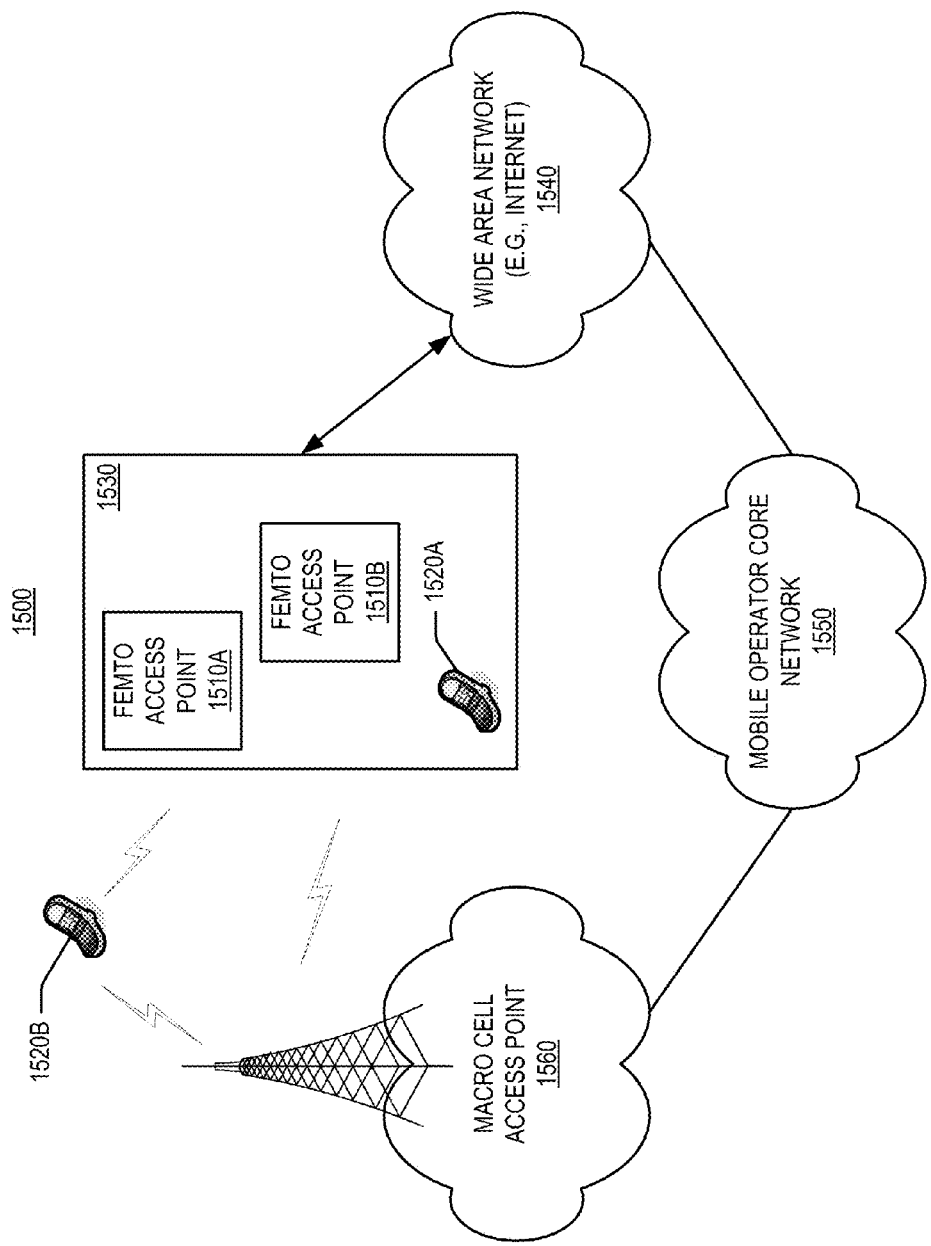
FIG. 15 is a simplified diagram of a wireless communication system including femto nodes.

FIG. 15 illustrates an exemplary communication system 1500 where one or more femto access points are deployed within a network environment. Specifically, the system 1500 includes multiple femto access points 1510 (e.g., femto access points 1510A and 1510B) installed in a relatively small scale network environment (e.g., in one or more user residences 1530). Each femto access point 1510 may be coupled to a wide area network 1540 (e.g., the Internet) and a mobile operator core network 1550 via a DSL router, a cable modem, a wireless link, or other connectivity means (not shown). As will be discussed below, each femto access point 1510 may be configured to serve associated access terminals 1520 (e.g., access terminal 1520A) and, optionally, other (e.g., hybrid or alien) access terminals 1520 (e.g., access terminal 1520B). In other words, access to femto access points 1510 may be restricted whereby a given access terminal 1520 may be served by a set of designated (e.g., home) femto access point(s) 1510 but may not be served by any non-designated femto access points 1510 (e.g., a neighbor's femto access point 1510).

Figure 16:
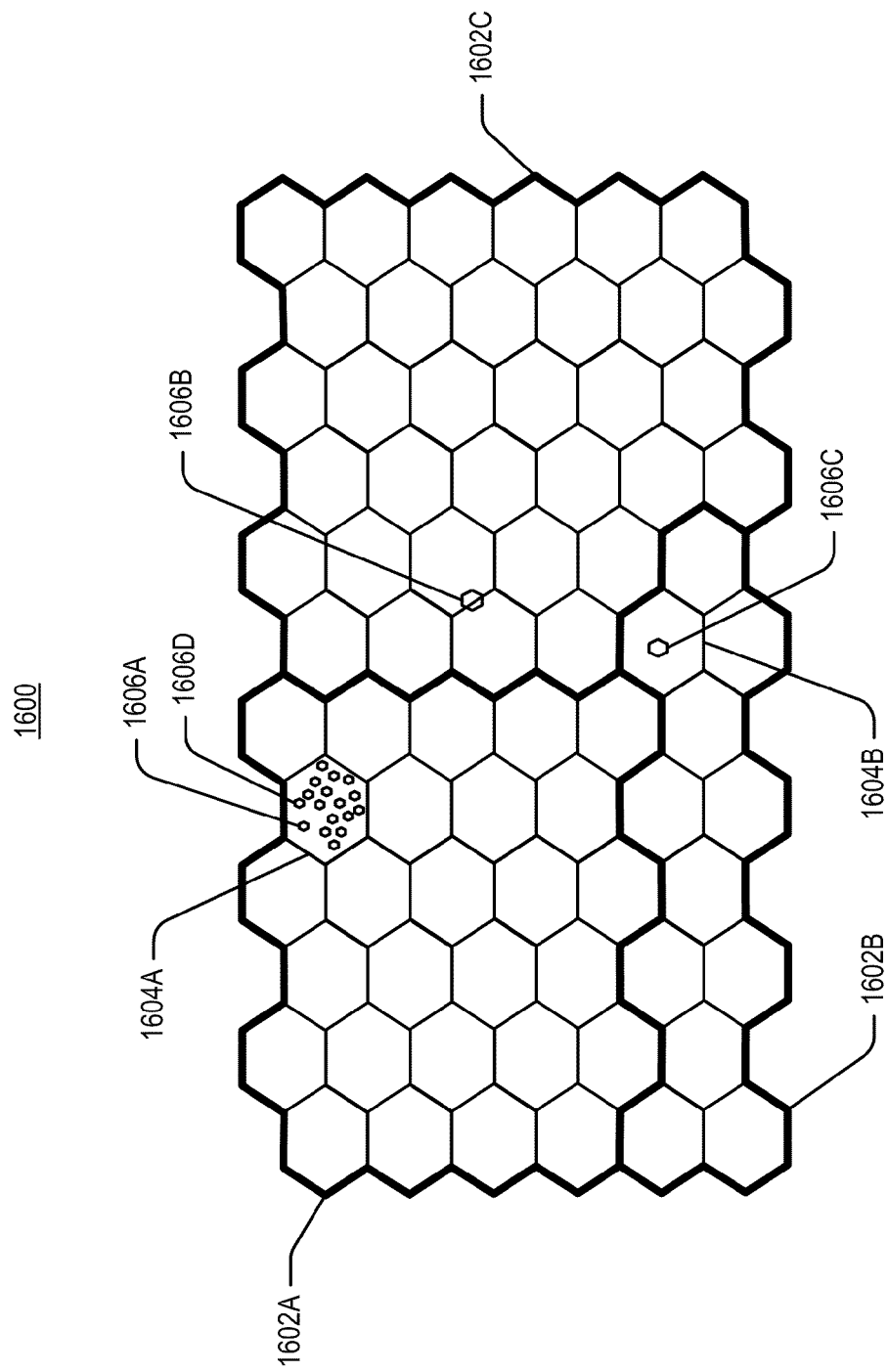
FIG. 16 is a simplified diagram illustrating coverage areas for wireless communication.

FIG. 16 illustrates an example of a coverage map 1600 where several tracking areas 1602 (or routing areas or location areas) are defined, each of which includes several macro coverage areas 1604. Here, areas of coverage associated with tracking areas 1602A, 1602B, and 1602C are delineated by the wide lines and the macro coverage areas 1604 are represented by the larger hexagons. The tracking areas 1602 also include femto coverage areas 1606. In this example, each of the femto coverage areas 1606 (e.g., femto coverage areas 1606B and 1606C) is depicted within one or more macro coverage areas 1604 (e.g., macro coverage areas 1604A and 1604B). It should be appreciated, however, that some or all of a femto coverage area 1606 may not lie within a macro coverage area 1604. In practice, a large number of femto coverage areas 1606 (e.g., femto coverage areas 1606A and 1606D) may be defined within a given tracking area 1602 or macro coverage area 1604. Also, one or more pico coverage areas (not shown) may be defined within a given tracking area 1602 or macro coverage area 1604.

Referring again to FIG. 15, the owner of a femto access point 1510 may subscribe to mobile service, such as, for example, 3G mobile service, offered through the mobile operator core network 1550. In addition, an access terminal 1520 may be capable of operating both in macro environments and in smaller scale (e.g., residential) network environments. In other words, depending on the current location of the access terminal 1520, the access terminal 1520 may be served by a macro cell access point 1560 associated with the mobile operator core network 1550 or by any one of a set of femto access points 1510 (e.g., the femto access points 1510A and 1510B that reside within a corresponding user residence 1530). For example, when a subscriber is outside his home, he is served by a standard macro access point (e.g., access point 1560) and when the subscriber is at home, he is served by a femto access point (e.g., access point 1510A). Here, a femto access point 1510 may be backward compatible with legacy access terminals 1520.

A femto access point 1510 may be deployed on a single frequency or, in the alternative, on multiple frequencies. Depending on the particular configuration, the single frequency or one or more of the multiple frequencies may overlap with one or more frequencies used by a macro access point (e.g., access point 1560).

In some aspects, an access terminal 1520 may be configured to connect to a preferred femto access point (e.g., the home femto access point of the access terminal 1520) whenever such connectivity is possible. For example, whenever the access terminal 1520A is within the user's residence 1530, it may be desired that the access terminal 1520A communicate only with the home femto access point 1510A or 1510B.

In some aspects, if the access terminal 1520 operates within the macro cellular network 1550 but is not residing on its most preferred network (e.g., as defined in a preferred roaming list), the access terminal 1520 may continue to search for the most preferred network (e.g., the preferred femto access point 1510) using a better system reselection (BSR) procedure, which may involve a periodic scanning of available systems to determine whether better systems are currently available and subsequently acquire such preferred systems. The access terminal 1520 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 1510, the access terminal 1520 selects the femto access point 1510 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 1510 that reside within the corresponding user residence 1530). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 17:
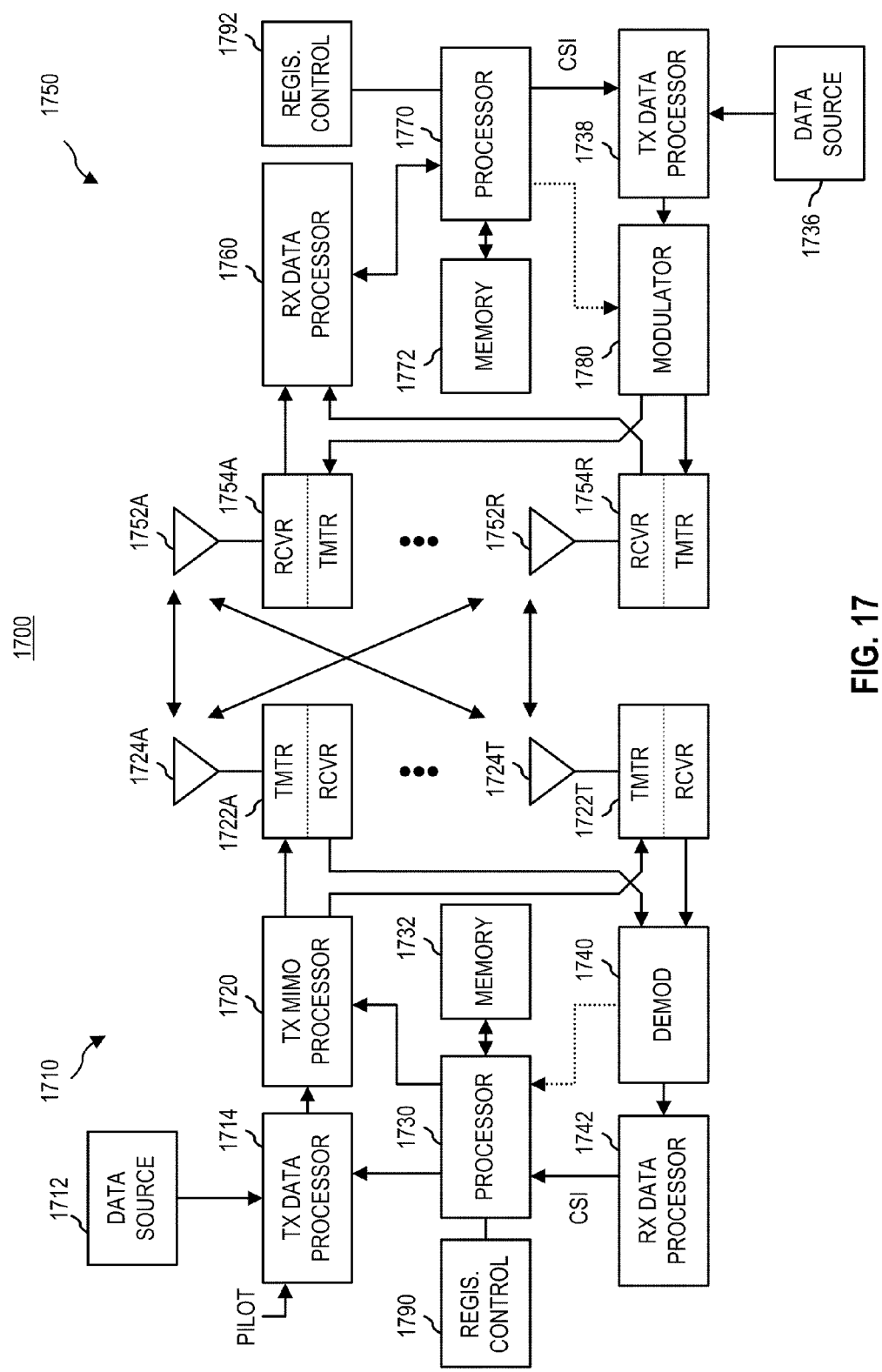
FIG. 17 is a simplified block diagram of several sample aspects of communication components.

FIG. 17 illustrates a wireless device 1710 (e.g., an access point) and a wireless device 1750 (e.g., an access terminal) of a sample MIMO system 1700. At the device 1710, traffic data for a number of data streams is provided from a data source 1712 to a transmit (TX) data processor 1714. Each data stream may then be transmitted over a respective transmit antenna.

The TX data processor 1714 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1730. A data memory 1732 may store program code, data, and other information used by the processor 1730 or other components of the device 1710.

The modulation symbols for all data streams are then provided to a TX MIMO processor 1720, which may further process the modulation symbols (e.g., for OFDM). The TX MIMO processor 1720 then provides $N_T$ modulation symbol streams to $N_T$ transceivers (XCVR) 1722A through 1722T. In some aspects, the TX MIMO processor 1720 applies beamforming weights to the symbols of the data streams and to the antenna from which the symbol is being transmitted.

Each transceiver 1722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1722A through 1722T are then transmitted from $N_T$ antennas 1724A through 1724T, respectively.

At the device 1750, the transmitted modulated signals are received by $N_R$ antennas 1752A through 1752R and the received signal from each antenna 1752 is provided to a respective transceiver (XCVR) 1754A through 1754R. Each transceiver 1754 conditions (e.g., filters, amplifies, and downconverts) a respective received signal, digitizes the conditioned signal to provide samples, and further processes the samples to provide a corresponding "received" symbol stream.

A receive (RX) data processor 1760 then receives and processes the $N_R$ received symbol streams from $N_R$ transceivers 1754 based on a particular receiver processing technique to provide $N_T$ "detected" symbol streams. The RX data processor 1760 then demodulates, deinterleaves, and decodes each detected symbol stream to recover the traffic data for the data stream. The processing by the RX data processor 1760 is complementary to that performed by the TX MIMO processor 1720 and the TX data processor 1714 at the device 1710.

A processor 1770 periodically determines which pre-coding matrix to use (discussed below). The processor 1770 formulates a reverse link message comprising a matrix index portion and a rank value portion. A data memory 1772 may store program code, data, and other information used by the processor 1770 or other components of the device 1750.

The reverse link message may comprise various types of information regarding the communication link and/or the received data stream. The reverse link message is then processed by a TX data processor 1738, which also receives traffic data for a number of data streams from a data source 1736, modulated by a modulator 1780, conditioned by the transceivers 1754A through 1754R, and transmitted back to the device 1710.

At the device 1710, the modulated signals from the device 1750 are received by the antennas 1724, conditioned by the transceivers 1722, demodulated by a demodulator (DEMOD) 1740, and processed by a RX data processor 1742 to extract the reverse link message transmitted by the device 1750. The processor 1730 then determines which pre-coding matrix to use for determining the beam-forming weights then processes the extracted message.

FIG. 17 also illustrates that the communication components may include one or more components that perform registration-related operations as taught herein. For example, a registration (REGIS.) control component 1790 may cooperate with the processor 1730 and/or other components of the device 1710 to send/receive signals to/from another device (e.g., device 1750) as taught herein. Similarly, a registration control component 1792 may cooperate with the processor 1770 and/or other components of the device 1750 to send/receive signals to/from another device (e.g., device 1710). It should be appreciated that for each device 1710 and 1750 the functionality of two or more of the described components may be provided by a single component. For example, a single processing component may provide the functionality of the registration control component 1790 and the processor 1730 and a single processing component may provide the functionality of the registration control component 1792 and the processor 1770.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 18:
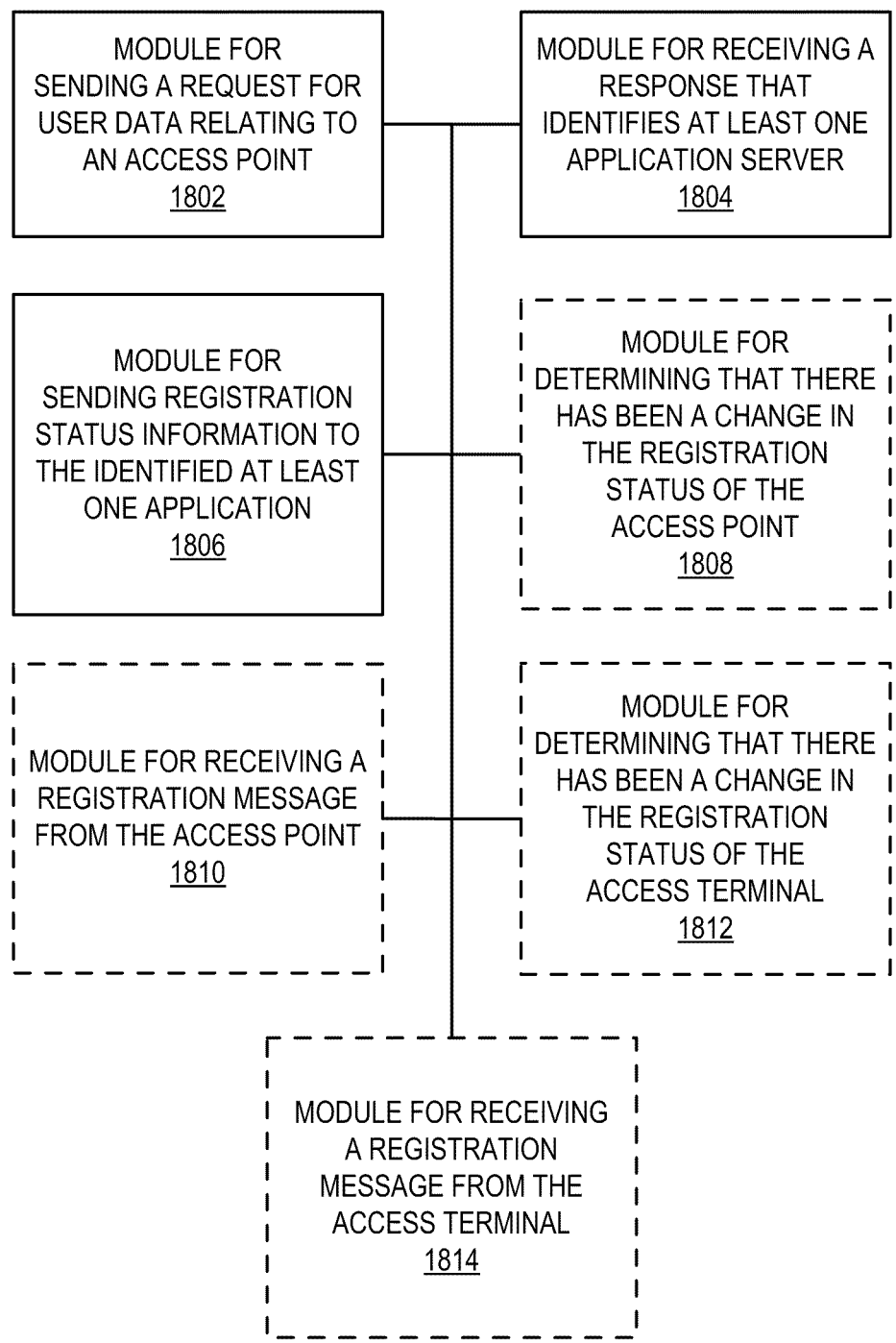
FIGS. 18 and 19 are simplified block diagrams of several sample aspects of apparatuses configured to facilitate access to specified applications as taught herein.
Figure 19:
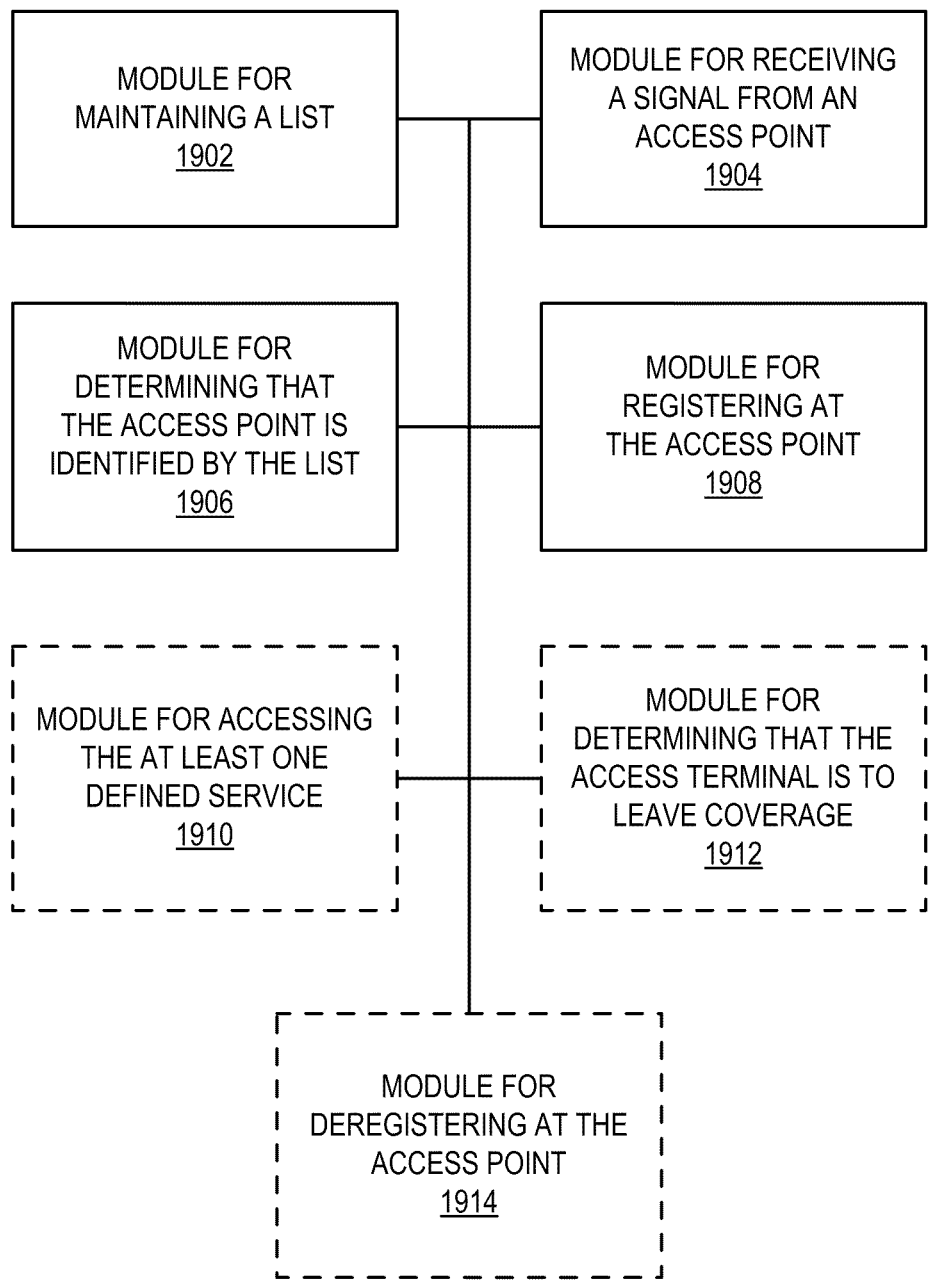

The functionality described herein (e.g., with regard to one or more of the accompanying figures) may correspond in some aspects to similarly designated "means for" functionality in the appended claims. Referring to FIGS. 18 and 19, apparatuses 1800 and 1900 are represented as a series of interrelated functional modules. Here, a module for sending a request for user data relating to an access point 1802 may correspond at least in some aspects to, for example, a network interface as discussed herein. A module for receiving a response that identifies at least one application server 1804 may correspond at least in some aspects to, for example, a network interface as discussed herein. A module for sending registration status information to the at least one application server 1806 may correspond at least in some aspects to, for example, a controller as discussed herein. A module for determining that there has been a change in the registration status of the access point 1808 may correspond at least in some aspects to, for example, a controller as discussed herein. A module for receiving a registration message from the access point 1810 may correspond at least in some aspects to, for example, a controller as discussed herein. A module for determining that there has been a change in the registration status of the access terminal 1812 may correspond at least in some aspects to, for example, a controller as discussed herein. A module for receiving a registration message from the access terminal 1814 may correspond at least in some aspects to, for example, a controller as discussed herein. A module for maintaining a list 1902 may correspond at least in some aspects to, for example, a memory component as discussed herein. A module for receiving a signal from an access point 1904 may correspond at least in some aspects to, for example, a receiver as discussed herein. A module for determining that the access point is identified by the list 1906 may correspond at least in some aspects to, for example, a controller as discussed herein. A module for registering at the access point 1908 may correspond at least in some aspects to, for example, a controller as discussed herein. A module for accessing the at least one defined service 1910 may correspond at least in some aspects to, for example, a controller as discussed herein. A module for determining that the access terminal is to leave coverage 1912 may correspond at least in some aspects to, for example, a controller as discussed herein. A module for deregistering at the access point 1914 may correspond at least in some aspects to, for example, a controller as discussed herein.

The functionality of the modules of FIGS. 18 and 19 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 18 and 19 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method, operable by a first network entity, comprising:
   sending a request from the first network entity to a second network entity to identify at least one application server, the first network entity communicatively coupled to the at least one application server, an access point, and an access terminal through the access point, wherein the access point receives a subscription from the at least one application server that authorizes the access point to provide the access terminal access to at least one defined service;
   receiving, at the first network entity from the second network entity, a response including a list identifying the at least one application server to which the access point is subscribed; and
   sending, from the first network entity to the at least one application server, a registration status signaling that the access terminal is in a coverage area of the access point.

2. The method of claim 1, wherein the registration status indicates that the access point has registered with an Internet Protocol Multimedia Subsystem or that the access point has deregistered with the Internet Protocol Multimedia Subsystem.

3. The method of claim 1, further comprising:
   determining a change in the registration status relating to the access point; and
   sending the request based on the determined change in the registration status.

4. The method of claim 3, further comprising receiving a registration message from the access point, wherein the determining the change in the registration status of the access point is based on the registration message.

5. The method of claim 1, wherein the registration status indicates that the access terminal registered at the access point or that the access terminal is no longer registered at the access point.

6. The method of claim 1, further comprising:
determining a change in the registration status relating to the access terminal; and
sending the request based on the determined change in the registration status.

7. The method of claim 6, further comprising receiving a registration message from the access terminal, wherein the determining the change in the registration status of the access terminal is based on the registration message.

8. The method of claim 1, wherein the request comprises an identifier of the access point and subscription data associated with the access point.

9. The method of claim 1, wherein:
the access point comprises a femto access point;
the first network entity comprises a femto convergence server; and
the second network entity comprises a home subscriber server.

10. The method of claim 9, wherein:
the request comprises a User-Data-Request command; and
the response to the request comprises a User-Data-Answer command.

11. The method of claim 1, wherein:
the first network entity comprises an entity operable to manage sessions for users; and
the second network entity comprises an entity operable to manage subscriber information.

12. The method of claim 1, wherein:
the first network entity comprises a call session control function; and
the second network entity comprises a home subscriber server.

13. An apparatus for communication, comprising:
a network interface operable to send a request to a network entity, wherein the request relates to identification of at least one application server to which an access point is subscribed, the network interface communicatively coupled to the at least one application server, the access point, and an access terminal through the access point, wherein the access point receives a subscription from the at least one application server that authorizes the access point to provide the access terminal access to at least one defined service, the network interface further operable to receive a response from the network entity based on the request, wherein the response comprises a list including the at least one application server to which the access point is subscribed; and
a controller operable to send, via the network interface, a registration status to the at least one application server, wherein the registration status indicates that the access terminal is located in a coverage area of the access point.

14. The apparatus of claim 13, wherein the registration status indicates that the access point registered with an Internet Protocol Multimedia Subsystem or that the access point deregistered with the Internet Protocol Multimedia Subsystem.

15. The apparatus of claim 13, wherein:
the controller is further operable to determine a change in the registration status of the access point; and
the request is sent based on the determined change in the registration status.

16. The apparatus of claim 15, wherein:
the network interface is further operable to receive a registration message from the access point; and
the determined change in the registration status of the access point is based on the registration message.

17. The apparatus of claim 13, wherein the registration status indicates that the access terminal registered at the access point or that the access terminal is no longer registered at the access point.

18. The apparatus of claim 13, wherein:
the controller is further operable to determine a change in the registration status of the access terminal; and
the request is sent based on the determined change in the registration status.

19. The apparatus of claim 18, wherein:
the network interface is further operable to receive a registration message from the access terminal; and
the determined change in the registration status of the access terminal is based on the registration message.

20. The apparatus of claim 13, wherein the request comprises an identifier of the access point and subscription data associated with the access point.

21. The apparatus of claim 13, wherein:
the access point comprises a femto access point;
the apparatus comprises a femto convergence server; and
the second network entity comprises a home subscriber server.

22. The apparatus of claim 21, wherein:
the request comprises a User-Data-Request command; and
the response to the request comprises a User-Data-Answer command.

23. The apparatus of claim 13, further comprising an entity operable to manage sessions for users, wherein the second network entity comprises an entity operable to manage subscriber information.

24. The apparatus of claim 13, further comprising a call session control function, wherein the second network entity comprises a home subscriber server.

25. An apparatus for communication, comprising:
means for sending a request to a network entity to identify at least one application server, the apparatus communicatively coupled to the at least one application server, an access point, and an access terminal through the access point, wherein the access point receives a subscription from the at least one application server that authorizes the access point to provide the access terminal access to at least one defined service;
means for receiving, from the network entity, a response including a list identifying the at least one application server to which the access point is subscribed; and
means for sending to the at least one application server a registration status signaling that the access terminal is in a coverage area of the access point.

26. The apparatus of claim 25, wherein the registration status indicates that the access point has registered with an Internet Protocol Multimedia Subsystem or that the access point has deregistered with the Internet Protocol Multimedia Subsystem.

27. The apparatus of claim 25, further comprising:
means for determining a change in the registration status relating to the access point; and
means for sending the request based on the determined change in the registration status.

28. The apparatus of claim 25, wherein:
the access point comprises a femto access point;
the apparatus comprises a femto convergence server; and the second network entity comprises a home subscriber server.

29. The apparatus of claim 28, wherein:
the request comprises a User-Data-Request command; and
the response to the request comprises a User-Data-Answer command.

30. A non-transitory computer-readable medium comprising code for causing a computer to:
send a request from a first network entity to a second network entity to identify at least one application server, the first network entity communicatively coupled to the at least one application server an access point, and an access terminal through the access point, wherein the access point receives a subscription from the at least one application server that authorizes the access point to provide the access terminal access to at least one defined service;
receive, at the first network entity from the second network entity, a response including a list identifying the at least one application server to which the access point is subscribed; and
send, from the first network entity to the at least one application server, a registration status signaling that the access terminal is in a coverage area of the access point.

31. The non-transitory computer-readable medium of claim 30, wherein the registration status indicates that the access point has registered with an Internet Protocol Multimedia Subsystem or that the access point has deregistered with the Internet Protocol Multimedia Subsystem.

32. The non-transitory computer-readable medium of claim 30, wherein the code further causes the computer to:
determine a change in the registration status relating to the access point; and
send the request based on the determined change in the registration status.

33. The non-transitory computer-readable medium of claim 30, wherein:
the access point comprises a femto access point;
the first network entity comprises a femto convergence server; and
the second network entity comprises a home subscriber server.

34. The non-transitory computer-readable medium of claim 33, wherein:
the request comprises a User-Data-Request command; and
the response to the request comprises a User-Data-Answer command.

35. A method of communication, comprising:
maintaining at an access terminal, a list identifying at least one access point at which the access terminal is to register;
receiving a signal from a first access point, wherein the first access point receives, from at least one application server, a subscription to at least one defined service, and wherein the subscription authorizes the first access point to provide the access terminal with access to the at least one defined service;
determining that the first access point is identified by the list; and
registering at the first access point based on the determination that the first access point is identified by the list, wherein the registering informs the at least one application server that the access terminal is located in a coverage area of the first access point such that the at least one application server allows the access terminal to utilize the at least one defined service via the access provided by the first access point.

36. The method of claim 35, wherein the subscription to the at least one defined service for the access terminal specifies that the access terminal is authorized to access the at least one defined service via the at least one application server if the access terminal is registered at the first access point.

37. The method of claim 36, further comprising accessing the at least one defined service as a result of the registration.

38. The method of claim 35, further comprising:
determining that the access terminal is to leave the coverage area of the first access point; and
deregistering at the first access point as a result of the determination that the access terminal is to leave the coverage area.

39. The method of claim 35, wherein the registering at the first access point comprises registering with an Internet Protocol Multimedia Subsystem via the first access point.

40. The method of claim 35, wherein:
the access terminal comprises a circuit switched-based access terminal that does not comprise an Internet Protocol Multimedia Subsystem client; and
the access terminal obtains access to an Internet Protocol Multimedia Subsystem service as a result of the registration.

41. The method of claim 35, wherein the first access point comprises a femto access point.

42. An apparatus for communication, comprising:
a memory component operable to maintain a list that identifies at least one access point at which the apparatus is to register;
a receiver operable to receive a signal from a first access point, wherein the first access point receives, from at least one application server, a subscription to at least one defined service, and wherein the subscription authorizes the first access point to provide the apparatus with access to the at least one defined service; and
a controller operable to determine that the first access point is identified by the list, and further operable to perform a registration at the first access point as a result of the determination that the first access point is identified by the list, wherein the registration includes an indication to the at least one application server that the apparatus is in a coverage area of the first access point such that the at least one application server allows the apparatus to utilize the at least one defined service via the access provided by the first access point.

43. The apparatus of claim 42, wherein the subscription to the at least one defined service specifies that the apparatus is authorized to access the at least one defined service via the at least one application server if the apparatus is registered at the first access point.

44. The apparatus of claim 43, wherein the controller is further operable to access the at least one defined service as a result of the registration.

45. The apparatus of claim 42, wherein the controller is further operable to:
determine that the apparatus is to leave the coverage area of the first access point; and
deregister at the first access point as a result of the determination that the apparatus is to leave the coverage area.

46. The apparatus of claim 42, wherein the controller is operable to register with an Internet Protocol Multimedia Subsystem via the first access point.

47. The apparatus of claim 42,
further comprising a circuit switched-based access terminal that does not comprise an Internet Protocol Multimedia Subsystem client, wherein the apparatus obtains access to an Internet Protocol Multimedia Subsystem service as a result of the registration.

48. The apparatus of claim 42, wherein the first access point comprises a femto access point.

49. An apparatus for communication, comprising:
   means for maintaining a list that identifies at least one access point at which the apparatus is to register;
   means for receiving a signal from the a first access point, wherein the first access point receives, from at least one application server, a subscription to at least one defined service, and wherein the subscription authorizes the first access point to provide the apparatus with access to at least one defined service;
   means for determining that the first access point is identified by the list; and
   means for registering at the first access point as a result of the determination that the first access point is identified by the list, wherein the means for registering informs the at least one application server that the apparatus is located in a coverage area of the first access point such that the at least one application server allows the apparatus to utilize the at least one defined service via the access provided by the first access point.

50. The apparatus of claim 49, further comprising:
   means for determining that the apparatus is to leave the coverage area of the first access point; and
   means for deregistering at the first access point as a result of the determination that the apparatus is to leave the coverage area.

51. The apparatus of claim 49, wherein the means for registering at the first access point comprises means for registering with an Internet Protocol Multimedia Subsystem via the first access point.

52. The apparatus of claim 49, wherein the first access point comprises a femto access point.

53. A non-transitory computer-readable medium storing computer executable code comprising:
   code for maintaining, at an access terminal, a list identifying at least one access point at which the access terminal is to register;
   code for receiving a signal from a first access point, wherein the first access point receives from at least one application server, a subscription to at least one defined service, and wherein the subscription authorizes the first access point to provide the access terminal with access to at least one defined service;
   code for determining that the first access point is identified by the list; and
   code for registering at the first access point based on the determination that first access point is identified by the list, wherein the registration informs the at least one application server that the access terminal is located in a coverage area of the first access point such that the at least one application server allows the access terminal to utilize the at least one defined service via the access provided by the first access point.

54. The non-transitory computer-readable medium of claim 53, further comprising:
   code for determining that the access terminal is to leave the coverage area of the first access point; and
   code for deregistering at the first access point as a result of the determination that the access terminal is to leave the coverage area.

55. The non-transitory computer-readable medium of claim 53, further comprising code for registering with an Internet Protocol Multimedia Subsystem via the first access point.

56. The non-transitory computer-readable medium of claim 53, wherein the first access point comprises a femto access point.

* * * * *